United States Patent
Micko et al.

(10) Patent No.: US 10,445,998 B2
(45) Date of Patent: Oct. 15, 2019

(54) MOTION SENSOR FOR OCCUPANCY DETECTION AND INTRUSION DETECTION

(71) Applicant: Greenwave Systems PTE. LTD., Singapore (SG)

(72) Inventors: Eric Scott Micko, Singapore (SG); Guang Liang Zhu, Singapore (SG)

(*) Notice: Subject to any disclaimer, the term of this patent is extended or adjusted under 35 U.S.C. 154(b) by 0 days.

(21) Appl. No.: 16/103,757

(22) Filed: Aug. 14, 2018

(65) Prior Publication Data

US 2019/0080573 A1     Mar. 14, 2019

Related U.S. Application Data

(63) Continuation of application No. PCT/US2017/019414, filed on Feb. 24, 2017.
(Continued)

(51) Int. Cl.
*G01J 5/00*    (2006.01)
*G08B 13/191*  (2006.01)
(Continued)

(52) U.S. Cl.
CPC .......... *G08B 13/191* (2013.01); *G01J 5/0025* (2013.01); *G01J 5/0806* (2013.01);
(Continued)

(58) Field of Classification Search
CPC .......... G08B 13/191; G01J 5/0025; G01J 5/34
See application file for complete search history.

(56) References Cited

U.S. PATENT DOCUMENTS

| 4,614,938 A | 9/1986 | Weitman |
| 4,618,854 A | 10/1986 | Miyake et al. |

(Continued)

FOREIGN PATENT DOCUMENTS

| CN | 2255673 | 6/1997 |
| CN | 100565139 | 12/2009 |

(Continued)

OTHER PUBLICATIONS

US 9,905,121 B2, 02/2018, Micko (withdrawn)
(Continued)

*Primary Examiner* — Hugh Maupin
(74) *Attorney, Agent, or Firm* — Young's Patent Services; Bruce A Young

(57) ABSTRACT

A motion sensor has an infrared detector with a first set of detector elements coupled to a first channel and a second set of detector elements coupled to a second channel. A first optical subsystem directs infrared radiation from a first number of monitored volumes to the infrared detector and a second optical subsystem directs infrared radiation from a second number of monitored volumes to the infrared detector. Intrusion detection circuitry is coupled to both channels of the infrared detector and selects a set of peaks in the first channel and the second channel. It then calculates an alternation score based on a number of alternating peaks in the set of peaks, and indicates an intrusion detection based, at least in part, on the alternation score. The circuitry also determines a peak-to-peak period for the first channel and calculates a slope-synchrony measurement to modify the alternation score.

20 Claims, 15 Drawing Sheets

Related U.S. Application Data

(60) Provisional application No. 62/299,111, filed on Feb. 24, 2016.

(51) Int. Cl.
    *G01J 5/34*           (2006.01)
    *G01J 5/08*           (2006.01)
    *G08B 13/193*       (2006.01)
    *G08B 29/18*        (2006.01)

(52) U.S. Cl.
    CPC ............... *G01J 5/089* (2013.01); *G01J 5/34* (2013.01); *G08B 13/193* (2013.01); *G08B 29/18* (2013.01); *G08B 29/185* (2013.01); *G01J 2005/345* (2013.01)

(56) References Cited

U.S. PATENT DOCUMENTS

| | | | |
|---|---|---|---|
| 4,704,533 A | 11/1987 | Rose et al. | |
| 4,800,278 A | 1/1989 | Taniguti et al. | |
| 4,963,749 A | 10/1990 | McMaster | |
| 4,988,116 A | 1/1991 | Evertsen | |
| 5,045,702 A | 9/1991 | Mulleer | |
| 5,105,084 A | 4/1992 | Nagai et al. | |
| 5,283,551 A | 2/1994 | Guscott | |
| 5,313,060 A * | 5/1994 | Gast ........................ | G07C 9/00 250/221 |
| 5,461,231 A | 10/1995 | Sugimoto et al. | |
| 5,789,751 A | 8/1998 | Ma | |
| 5,923,250 A | 7/1999 | Pildner et al. | |
| 5,936,666 A | 8/1999 | Davis | |
| 6,049,080 A | 4/2000 | Ito | |
| 6,163,025 A | 12/2000 | Pantus | |
| 6,340,816 B1 | 1/2002 | Micko | |
| 6,350,076 B1 | 2/2002 | Wagner et al. | |
| 6,559,448 B1 | 5/2003 | Mueller et al. | |
| 6,879,240 B2 | 4/2005 | Kruse | |
| 7,042,134 B2 | 5/2006 | Micko | |
| 7,075,431 B2 | 7/2006 | Buckley et al. | |
| 7,141,910 B2 | 11/2006 | Micko | |
| 7,183,912 B2 | 2/2007 | Micko | |
| 7,352,107 B2 | 4/2008 | Micko | |
| 7,362,224 B2 | 4/2008 | Zambon | |
| 7,399,969 B2 | 7/2008 | Micko | |
| 7,399,970 B2 | 7/2008 | Micko | |
| 7,498,576 B2 | 3/2009 | Micko | |
| 7,579,595 B2 | 8/2009 | Micko | |
| 7,622,845 B2 | 11/2009 | Micko | |
| 7,628,551 B2 | 12/2009 | Leyden et al. | |
| 7,686,287 B2 | 3/2010 | Dixon et al. | |
| 7,710,337 B2 | 5/2010 | Blalock | |
| 7,755,052 B2 | 7/2010 | Micko | |
| 7,909,521 B2 | 3/2011 | Son | |
| 8,314,390 B2 | 11/2012 | Micko | |
| 8,354,643 B2 | 1/2013 | Micko | |
| 8,378,820 B2 | 2/2013 | Micko | |
| 8,414,201 B2 | 4/2013 | Skeoch et al. | |
| D742,770 S | 11/2015 | Windstrup et al. | |
| 9,188,487 B2 | 11/2015 | Zhevelev et al. | |
| 9,255,786 B2 | 2/2016 | Micko | |
| 9,301,412 B2 | 3/2016 | Micko et al. | |
| 9,304,044 B2 | 4/2016 | Micko | |
| 9,377,156 B2 | 6/2016 | Wong | |
| 9,569,953 B2 | 2/2017 | Micko | |
| 10,055,973 B2 | 8/2018 | Micko | |
| 2004/0118985 A1 | 6/2004 | Omps | |
| 2004/0164647 A1 | 8/2004 | Micko | |
| 2004/0169145 A1 | 9/2004 | Micko | |
| 2005/0040947 A1 | 2/2005 | Buckley et al. | |
| 2005/0061979 A1 | 3/2005 | Narasako et al. | |
| 2005/0184869 A1 | 8/2005 | Micko | |
| 2005/0219046 A1 | 10/2005 | Noguchi | |
| 2005/0247845 A1 | 11/2005 | Li et al. | |
| 2006/0138329 A1 | 6/2006 | Wu et al. | |
| 2006/0152109 A1 | 7/2006 | Micko | |
| 2006/0254999 A1 | 11/2006 | Senften | |
| 2007/0030148 A1 | 2/2007 | Gabriel et al. | |
| 2007/0099469 A1 | 5/2007 | Sorensen | |
| 2007/0114346 A1 | 5/2007 | Omps | |
| 2008/0170121 A1 | 7/2008 | Su et al. | |
| 2009/0065671 A1 | 3/2009 | Burgstaller | |
| 2009/0196597 A1 | 8/2009 | Messinger et al. | |
| 2009/0302220 A1 | 12/2009 | Micko | |
| 2010/0220192 A1 | 9/2010 | Cirker | |
| 2011/0210253 A1 | 9/2011 | Micko | |
| 2012/0038778 A1 | 2/2012 | Klager et al. | |
| 2012/0105229 A1 | 5/2012 | Kates | |
| 2013/0119253 A1 | 5/2013 | Zhevelev et al. | |
| 2013/0169805 A1 | 7/2013 | Park | |
| 2014/0319349 A1 | 10/2014 | Horie et al. | |
| 2014/0350436 A1 | 11/2014 | Nathan et al. | |
| 2015/0208826 A1 | 7/2015 | Yang et al. | |
| 2015/0233702 A1 | 8/2015 | Micko | |
| 2015/0233765 A1 | 8/2015 | Micko | |
| 2016/0010972 A1 | 1/2016 | Micko | |
| 2018/0335342 A1 | 11/2018 | Micko et al. | |

FOREIGN PATENT DOCUMENTS

| | | |
|---|---|---|
| CN | 202284971 U | 6/2012 |
| CN | 102472030 B | 5/2014 |
| EP | 2533026 A | 12/2012 |
| JP | S58213396 A | 12/1983 |
| JP | S6214028 B2 | 3/1987 |
| JP | H09297057 A | 11/1997 |
| JP | 2006018750 A | 1/2006 |
| JP | 2009014483 A | 1/2009 |
| JP | 2013210306 A | 10/2013 |
| KR | 1020100065897 A | 6/2010 |
| KR | 20100009894 U | 10/2010 |
| KR | 1020100109125 A | 10/2010 |
| KR | 1020100116828 A | 11/2010 |
| WO | 2015088470 A1 | 6/2015 |
| WO | 2015132272 A1 | 9/2015 |
| WO | 2015187326 A1 | 12/2015 |
| WO | 2017147462 A1 | 8/2017 |

OTHER PUBLICATIONS

AFDIP, Response-Amendment to Office Action in Counterpart Chinese Application 20130081471.3, dated Oct. 30, 2017.
Canadian Intellectual Property Office, Office Action for counterpart Canadian Patent Application 2930127, dated May 31, 2017.
Chinese Intellectual Property Office, Office Action in Counterpart Application 20130081471.3, dated Mar. 7, 2018.
Chinese Intellectual Property Office, Office Action in Counterpart Application 20130081471.3, dated Jun. 28, 2017.
Chowdhury, et al., Video Synthesis of Arbitrary Views for Approximately Planar Scenes, Proceedings of International Conference on Acoustics, Speech and Signal Processing (ICASSP'03), pp. III_497-III_500, Apr. 6, 2003.
European Patent Office, Provisional Opinion for counterpart EPO Application 13899275.5, dated Jun. 8, 2017.
European Patent Office, Supplemental Search Opinion for counterpart EPO Application 13899275.5, dated Oct. 6, 2017.
Intellectual Property Office of Singapore, Written Opinion regarding foreign counterpart application SG 12201604463U, dated Apr. 25, 2017.
Intellectual Property Office of Singapore, Examination Report for Counterpart Singaporean patent application 11201604463U, dated Nov. 9, 2017.
Japan Patent Office, Final Notice of Reasons for Refusal for counterpart Japanese application 2016-557872, dated May 22, 2018.
Japan Patent Office, Notice of Reasons for Refusal for counterpart Japanese application 2016-557872, dated Sep. 5, 2017.
Kang, Ea Roo, Response to Office Action in related Korean Application 10-2016-7018545, dated Jun. 27, 2018.
Keane, Paul, Office Action Response for counterpart EPO application 13899275.5, dated Mar. 16, 2018.

(56) References Cited

OTHER PUBLICATIONS

Korean Intellectual Property Office, International Search Report for International Patent Application #PCT/US13/73799, dated Sep. 23, 2014.
Korean Intellectual Property Office, International Search Report for PCT/US2015/030692, dated Aug. 26, 2015.
Korean Intellectual Property Office, International Search Report for PCT/US2017/016106, 2017-04020.
Korean Intellectual Property Office, Notice of Allowance for related Korean Applicatoin 10-2016-7018545, dated Jul. 17, 2018.
Korean Intellectual Property Office, Notification of Reason for Refusal for related Korean Patent Application 10-2016-7018545, dated Mar. 29, 2018.
Korean Intellectual Property Office, Written Opinion of the International Search Authority for PCT/US2017/016106, dated Apr. 20, 2017.
Korean Intellectual Property Office, Written Opinion of the International Searching Authority for International Patent Application #PCT/US13/73799, dated Sep. 23, 2014.
Korean Intellectual Property Office, Written Opinion of the International Searching Authority for PCT/US2015/030692, dated Mar. 26, 2015.
Korean IP Office, International Search Report for PCT/US2017/019414, dated Apr. 28, 2017.
Korean IP Office,Written Opinion of the International Searching Authority for PCT/US2017/019414, dated Apr. 28, 2017.
Kwon, Seonggeun, Written Opinion (Response) to Korean Intellectual Property Office in related application #KR-10-2016-7018545, dated Jun. 27, 2018.
Micko, Scott, Unpublished U.S. Appl. No. 14/699,184, filed Apr. 29, 2015.
Micko, Scott, Unpublished U.S. Appl. No. 14/699,277, filed Apr. 29, 2015.
Murai Shinjyu Gip, Amendment-Response to Notice of Reasons for Refusal for counterpart Japanese application 2016-557872, dated Dec. 27, 2017.
Murai Shinjyu Gip, Amendment-Response to Notice of Reasons for Refusal for counterpart Japanese application 2016-557872, dated Jul. 5, 2018.
NETGEAR, VueZone Wireless Video Cameras: How it Works—Internet Web Page dated Oct. 6, 2012, retrieved from "https://web.archive.org/web/20111121082129/http://www.vuezone.com/learn-more/how-it-works" on Jun. 23, 2015.
Paton, Miram, Amendment/Remarks After Examiner's Report in counterpart Canadian Patent Application 2930127, dated Feb. 12, 2018.
Quek, Regina, Response to Written Opinion of Intellectual Property Office of Singapore for related Singapore Patent Applicatino #11201604463U, dated Sep. 25, 2017.
Unpublished Design U.S. Appl. No. 29/540,768, filed Sep. 28, 2015.
Unpublished Design U.S. Appl. No. 29/540,774, filed Sep. 28, 2015.
USPTO, non-final Office Action for U.S. Appl. No. 14/857,516, dated Apr. 8, 2016.
USPTO, Non-Final Office Action for U.S. Appl. No. 14/777,979, dated May 19, 2017.
USPTO, Non-Final Office Action for U.S. Appl. No. 14/857,516, dated Sep. 2, 2016.
USPTO, Notice of Allowance for U.S. Appl. No. 14/292,998 dated Nov. 20, 2015.
USPTO, Notice of Allowance for U.S. Appl. No. 14/699,277, dated Aug. 18, 2015.
USPTO, Notice of Allowance for U.S. Appl. No. 14/777,979, dated Nov. 24, 2017.
USPTO, Notice of Allowance for U.S. Appl. No. 14/777,979, dated May 10, 2018.
USPTO, Notice of Allowance for U.S. Appl. No. 14/857,516, dated Oct. 13, 2016.
USPTO, Notice of Allowance for U.S. Appl. No. 14/857,516, dated Nov. 25, 2016.
Windstrup et al., Unpublished Design U.S. Appl. No. 29/478,518, filed Jan. 6, 2014.
Wu, et al., The Pyroelectric Sensor Based System; Human Tracking and Self-Calibration Scheme, Information Science and Technology (ICIST), 2012 International Conference on, IEEE, pp. 839-846, Mar. 23, 2012.
Young, Bruce, Preliminary Amendment for U.S. Appl. No. 14/777,516, dated Sep. 18, 2015.
Young, Bruce, Response to Non-Final Office Action for U.S. Appl. No. 14/777,516, dated Jun. 28, 2016.
Young, Bruce, Response to Non-Final Office Action for U.S. Appl. No. 14/777,516, dated Sep. 9, 2016.
Young, Bruce, Response to Non-Final Office Action for U.S. Appl. No. 14/777,979, dated Aug. 10, 2017.
Excelitas Technologies, DigiPyro(r) PYQ 2898 Application Note, 2011, retrieved from http://www.excelitas.com/downloads/app_digipyropyq2898_0208.pdf on Aug. 14, 2013.
Perkinelmer Optoelectronics, DigiPyro(r) Family PYD 1998, PYD 1988, PYD 1978 Application Note, 2008, retrieved from http://www.datasheetarchive.com/dl/Datasheets-UD4/DSAUD0062254.pdf on Sep. 10, 2013.

\* cited by examiner

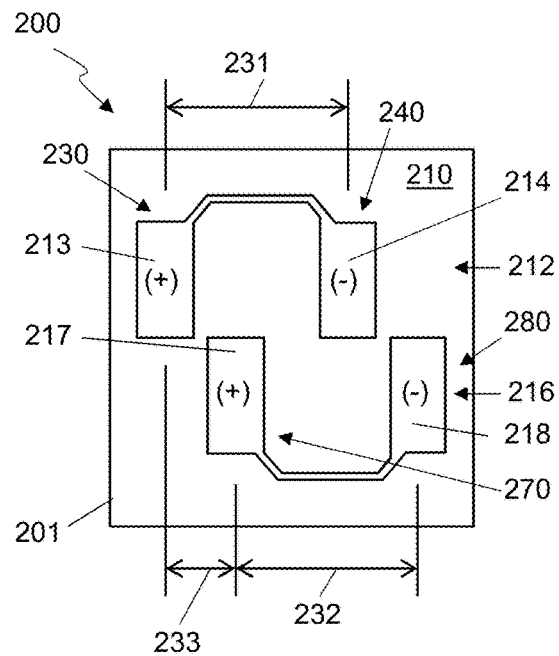
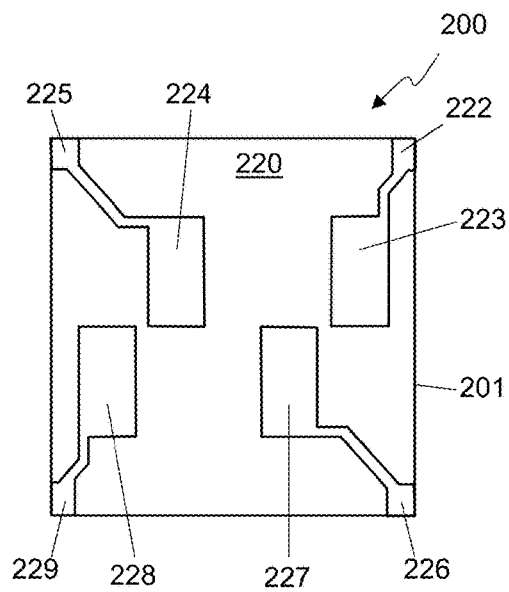
FIG. 2A
FIG. 2B
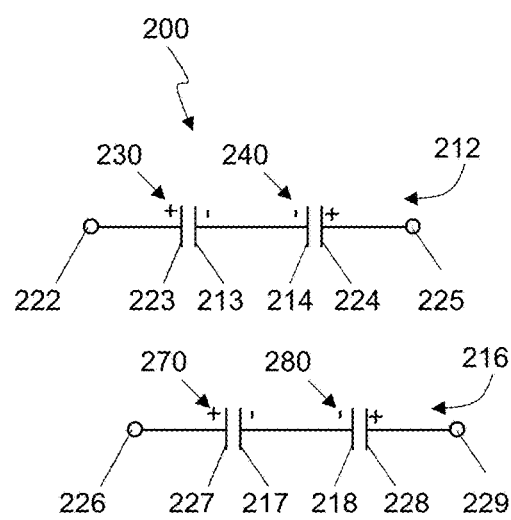
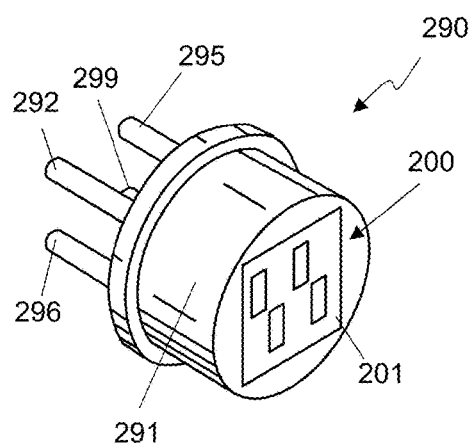
FIG. 2C
FIG. 2D

MOTION SENSOR FOR OCCUPANCY DETECTION AND INTRUSION DETECTION

CROSS-REFERENCE TO RELATED APPLICATIONS

The present application is a continuation of International Patent Application PCT/US2017/019414, entitled Motion Sensor for Occupancy Detection and Intrusion Detection, filed Feb. 24, 2017, which claims priority to U.S. Provisional Patent Application No. 62/299,111, entitled Motion Sensor for Occupancy Detection and Intrusion Detection, filed on Feb. 24, 2016. This patent application is also related to International Patent Application PCT/US2013/073799 published on Jun. 18, 2015 as WO2015/088470A1, entitled MOTION DETECTION, and International Patent Application PCT/US2015/030692 published on Dec. 10, 2015 as WO2015/187326A1, entitled MOUNT FOR SECURITY DEVICE. The entire contents of all of the above-mentioned Patent Applications are hereby incorporated by reference for any and all purposes.

BACKGROUND

Technical Field

The present subject matter relates to motion detection. More specifically it relates to multi-output infrared radiation detectors and motion sensors using such an infrared detector.

Background Art

Motion Sensors utilizing infrared radiation detectors, or simply IR detectors, are well known. Such sensors are often used in security systems or lighting systems to detect movement in a monitored space. An infrared detector detects changes in mid-infrared (IR) radiation having a wavelength of about 6-14 microns. These changes are due to temperature differences between a warm object, such as a warm blooded animal, and its background environment as the warm object moves through that environment. Upon detection of motion, motion sensors typically activate an audible alarm such as a siren, turn on a light, and/or transmit an indication that motion has been detected.

A typical IR detector utilizes a pyroelectric or piezoelectric substrate with a detector element that consists of conductive areas on opposite sides of the substrate, acting as a capacitor. As the substrate changes temperature, charge is added to or subtracted from the capacitor, changing the voltage across the capacitor. The amount of mid-IR radiation that hits the detector element determines the temperature of that area of the substrate, and therefore, the voltage across the capacitor that makes up the detector element. Some motion sensors utilize an infrared detector that includes multiple detector elements. To reduce the chance of false alarms, some infrared detectors include a pair of equally sized detector elements of opposing polarities. Non-focused out-of-band radiation, as well as ambient temperature changes or physical shock, is equally incident on both detector elements, thus causing the signals from the equal and opposite elements to roughly cancel one another.

Many motion sensors incorporate an optical array (made of optical elements, such as lenses, focusing mirrors, and so on) to be able to monitor a large space with a single infrared detector. The optical array directs the IR radiation from multiple monitored volumes onto the infrared detector, and sometimes includes filters to minimize the radiation outside of the desired mid-infrared range from reaching the infrared detector. Each of the monitored volumes is typically a pyramidal shaped volume extending into the space to be monitored with the apex of the pyramid at the motion sensor. Concentrations of radiation from each of the pyramids are projected by the optical arrays on to the infrared detector where they are superimposed, and different regions of the infrared detector are heated based on the amount of IR radiation received from the superimposed projections. The detector elements on the infrared detector react to the localized heating by changing their voltage. The resultant change in voltage across the detector elements is monitored and used to detect motion in the space being monitored.

While a motion sensor can be used for either occupancy detection or for detection of an intruder, the two uses have very different requirements. For intrusion detection, while effective detection of a human moving through a volume of interest is important, false detections can lead to negative consequences ranging from annoying alarm sirens that need to be turned off, to financial consequences from summoning the police too many times. So a motion sensor for intrusion detection needs to have good sensitivity while having a very high rejection of possible false alarm sources such as pets moving through a room. An occupancy sensor, however, has a very different use model. The consequences for turning a light on for falsely determining a room is occupied are very minor, perhaps a few pennies for electricity that wasn't really needed. But if a person is in a room and the lights repeatedly go off because the occupancy detector does not register the movement, the occupant is likely to become frustrated. This means that a motion sensor for occupancy detection needs to be very sensitive to small movements, but a relatively high rate of false alarms can be tolerated.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 2A and 2B are a front and rear view of an embodiment of an infrared detector;

FIG. 2C is a schematic of the embodiment of the infrared detector of FIG. 2A/B;

FIG. 2D is an isometric view of an embodiment of a packaged version of the infrared detector of FIG. 2A/B;

DETAILED DESCRIPTION

Figure 1A:
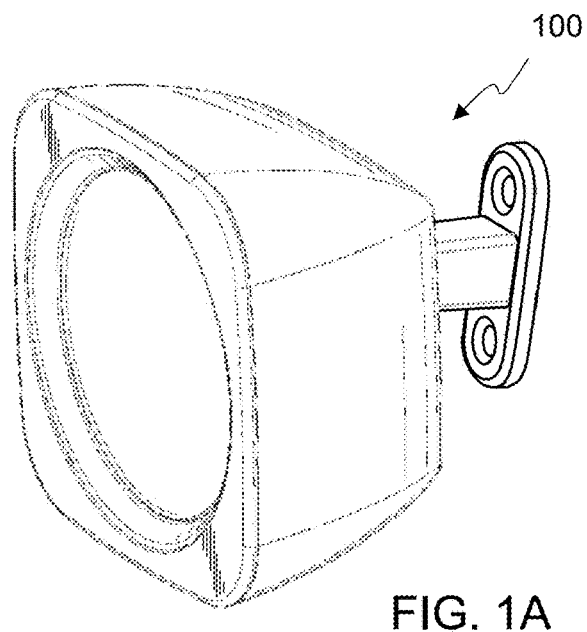
FIG. 1A shows an embodiment of a motion sensor.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Embodiments for a motion sensor are disclosed herein that can differentiate between animals and humans for the purposes of intrusion detection with a very low number of false intrusion detections, yet still operate as a highly sensitive occupancy detector. The embodiments within are designed to employ very simple microcontroller-performed calculation algorithms that support fast execution time in order to conserve battery life of the product in which the embodiment is provided. In some cases, the optical realization of a motion sensor results in fields of view that do not exclusively conform to the orderly phase relationships as described in the published International Patent Application WO2015/088470A1, thus potentially requiring very complex calculation algorithms. As a method of interpreting real-sensor phase relationships, while keeping the calculations simple, various embodiments are disclosed herein.

Embodiments use a peak-alternation algorithm as an alternative to detailed phase interpolation and calculations for the situation shown in FIG. 6A of published International Patent Application WO2015/088470A1. Due to occupancy-detection criteria requiring a relatively constant field of view size at heights where humans are expected, leading to asymmetric tiers of fields of view, such as a long-range tier having 9 field of view sets, a mid-range tier having 7 field of view sets, and a short-range tier having 4 field of view sets. So the fields of view in some embodiments are not vertically-aligned, leading to more complex waveforms than the simple phase shifted waveforms that would result from vertically-aligned fields of view. Rather than undertaking a complex process of wave-phase definition and measurement, some embodiments utilize a simpler approach by identifying peak locations on each channel of the IR detector and determining if the two channels' peak occurrences are alternating. In some embodiments an intrusion is detected if there are M alternating peaks in a set of N adjacent peaks, where M is smaller than N and are parameters that can be varied to tune the performance of a motion sensor design.

Both a local minimum and a local maximum in a signal are referred to as a peak in the signal. Various embodiments can use different algorithms to detect a peak, but in at least one embodiment, a peak is determined by detecting that the voltage level of a signal has changed by at least a predetermined threshold from a local maximum or minimum to provide hysteresis for the peak detection.

Some embodiments use a simple method to determine when meaningful peaks are not occurring synchronously, that is, when a peak occurs primarily as a result of single field of view occupancy such as the situation shown in FIG. 6B of published International Patent Application WO2015/088470A1. With human-walk signals, both channels exhibit nominal slopes at the same time, showing high slope synchrony, whereas a pet, because it can only occupy one field of view at a time, produces signal sets with a wave-peak slope on one channel at a time, exhibiting low slope synchrony between the channels. Low slope synchrony can be used to eliminate pet detection due to rare peak sequences that mimic human-walk peak sequences, yet that actually arise from distinctively pet-type signal sets having isolated peaks on separate channels. Slope synchrony is useful because it is not always feasible to evaluate and compare peak height due to multiple-frequency peak components. Thus, instead of evaluating height, relative slope activity can be compared between the two channels, to reduce false detections caused by pets even further than with peak alternation alone.

Reference now is made in detail to the examples illustrated in the accompanying drawings and discussed below.

FIG. 1A shows an embodiment of a motion sensor 100. The motion sensor 100 can be mounted to a wall and detect motion in a volume of interest by sensing changes in infrared (IR) radiation emitted in a plurality of monitored volumes, or fields of view, that are projected onto an IR detector.

Figure 1B:
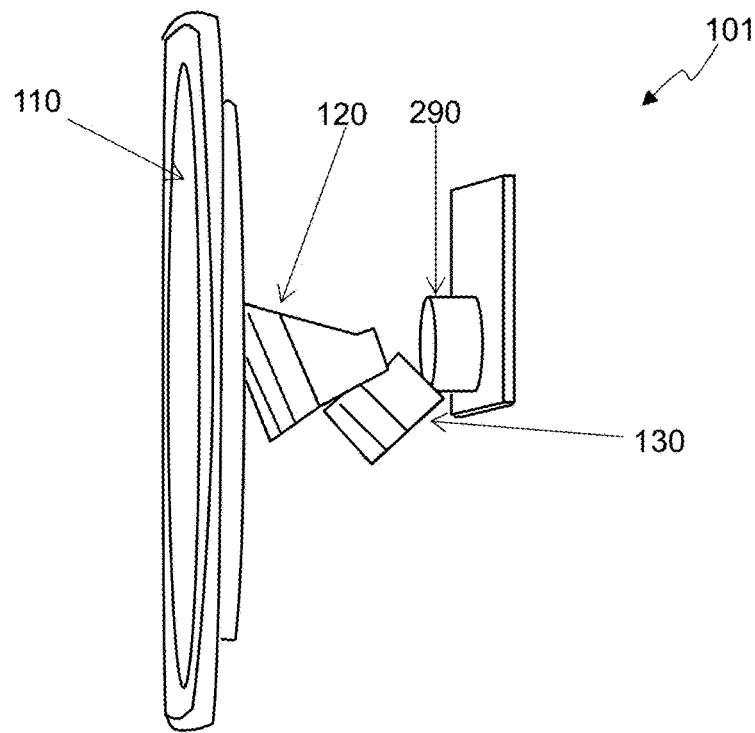
FIG. 1B shows a cut-away view of the motion sensor of FIG. 1A.

FIG. 1B shows a cut-away view 101 of the motion sensor 100 of FIG. 1A, exposing a high resolution triple lens-array design for the motion sensor 100. This embodiment includes 20 lens elements focusing onto 4 IR-detector elements of the IR detector 290, such as shown in FIG. 2D, creating 80 fields of view for the motion sensor. Other embodiments may have different numbers of lenses, such as different numbers of lenses per range, and/or different numbers of independent ranges. In some embodiments, the number of lenses between any two ranges share no common factor (i.e. are not both divisible by the same number). The structure includes a front window with a long-range nine-lens array 110, an interior mid-range seven-lens array 120, and an interior short-range four-lens array 130. The long-range lenses 110 have a comparatively long focal length, the mid-range lenses 120 have a mid-range focal length, and the short-range lenses 130 have a comparatively short focal length. In some embodiments, the ratio of the focal lengths between ranges is about equal to 1.414, or the square-root of 2. In at least one embodiment, the short-range lenses 130 have a focal length of about 10 millimeters (mm), the mid-range lenses 120 have a focal length of about 14 mm, and the long-range lenses 110 have a focal length of about 20 mm. In some embodiments the lens arrays 110, 120, 130 are Fresnel lenses, but other embodiments may use other optical technologies to focus the IR radiation from a field of view onto the individual IR detector elements such as traditional convex lens, concave mirrors, or other types of refractive and/or reflective elements.

FIGS. 2A and 2B are a front and rear view of an embodiment of an infrared detector 200. The infrared detector includes a substrate 201 made with at least some pyroelectric material. The infrared detector 200 includes a first row of detector elements 212 that includes one detector element 230 that includes pad 213 on the front side 210 of the substrate 201 and pad 223 on the back side 220 of the substrate 201, and another detector element 240 that includes pad 214 on the front side 210 of the substrate 201 and pad 224 on the back side 220 of the substrate 201. Note that pad 223 is opposite of pad 213 on the substrate 201, and pad 224 is opposite of pad 214 on the substrate 201. The two detector elements 230, 240 of the first row of detector elements 212 are positioned on the substrate 201 in a row direction (horizontal in FIG. 2A/B) spaced a pitch distance 231 apart. In the embodiment shown, the two detector elements 230, 240 are approximately the same size. The first row of detector elements 212 includes at least two serially coupled detector elements 230, 240 coupled between the output pad 222 and the output pad 225. In the embodiment shown, the detector element 230 is configured to provide a positive voltage between the output pad 225 and the output pad 222 in response to an increase in temperature, and the detector element 240 is configured to provide a negative voltage between the output pad 225 and the output pad 222 in response an increase in temperature.

The infrared detector 200 also includes a second row of detector elements 216 that includes one detector element 270 which includes pad 217 on the front side 210 of the substrate 201 and pad 227 on the back side 220 of the substrate 201 and another detector element 280 that includes pad 218 on the front side 210 of the substrate 201 and pad 228 on the back side 220 of the substrate 201. Note that pad 227 is opposite of pad 217 on the substrate 201 and that pad 228 is opposite of pad 218 on the substrate 201. The two detector elements 270, 280 of the second row of detector elements 218 are positioned on the substrate 201 in a row direction that is parallel to the first row 212 and spaced a pitch distance 232 apart that is about the same as the pitch distance 231 of the first row 212. In the embodiment shown, all four detector elements 230, 240, 270, 280 are approximately the same size. The second row of detector elements 216 includes at least two serially coupled detector elements 270, 280 coupled between the output pad 226 and the output pad 229. In the embodiment shown, the detector element 270 is configured to provide a positive voltage between the output pad 229 and the output pad 226 in response to an increase in temperature, and the detector element 280 is configured to provide a negative voltage between the output pad 229 and the output pad 226 in response to an increase in temperature.

In the embodiment of FIG. 2A/B, the first row of detector elements 212 and the second row of detector elements 216 are substantially non-overlapping. Substantially non-overlapping, as used herein and in the claims, means that more than 80% of the height (i.e. the dimension orthogonal to the row direction, or vertical in FIG. 2A/B) of detector elements 230, 240 of the first row 212 do not overlap with the detector elements 270, 280 of the second row 218. The detector elements 270, 280 of the second row 216 are, however, are positioned at a non-zero offset 233 from the first row of detector elements 212 in the row direction (horizontal in FIG. 2A/B). The offset 233 can be characterized as a percentage of the pitch distance 231, 232. In some embodiments, the non-zero offset is between about 5% of the pitch distance and about 95% of the pitch distance. In some embodiments, the offset 233 is about half of the pitch distance 231, 232 and can be referred to as a quadrature offset. In some embodiments, the offset 233 is not equal to one half of the pitch distance 231, 232, and the offset 233 can be referred to as a non-quadrature offset.

FIG. 2C is a schematic of the embodiment of the infrared detector 200 of FIG. 2A/B. The first row of serially coupled detector elements 212 are shown as polarized capacitors 230, 240 to indicate the polarity of voltage generated by the detector element in response to an increase in temperature. The electrodes of the capacitors 230, 240 are marked with the reference number of its corresponding pad of the detector element. So the detector element, or capacitor, 230 includes pad 223 and pad 213, and the detector element, or capacitor, 240 includes pad 214, and pad 224. The first row of detector elements 212 is coupled to the output pad 222 and to the output pad 225.

The second row of serially coupled detector elements 216 are shown as polarized capacitors 270, 280 to indicate the polarity of voltage generated by the detector element in response to an increase in temperature. The electrodes of the capacitors 270, 280 are marked with the reference number of its corresponding pad of the detector element. So the detector element, or capacitor, 270 includes pad 227 and pad 217, and the detector element, or capacitor, 280 includes pad 218, and pad 228. The second row of detector elements 216 is coupled to the output pad 226 and to the output pad 229. In at least some embodiments, the output pad 225 and output pad 229 are coupled to ground, and the output pad 222 is a first output of the infrared detector 200, and the output pad 226 is the second output of the infrared detector 200.

FIG. 2D is an isometric view of an embodiment of a packaged version 290 of the infrared detector 200 of FIG. 2A/B. The packaged version 290 includes a package 291 with the substrate 201 of the infrared detector 200 mounted inside of the package 291 behind a mid-IR-transmissive window (or window/filter) in a way to allow external mid-IR electromagnetic energy to affect the substrate 201 of the infrared detector 200 while at the same time shielding the substrate 101 from non-mid-IR influences. The packaged version 290 includes at least one terminal 292-299 accessible from outside of the package. In at least one embodiment, the output terminal 292 is coupled to the output pad 222, the output terminal 295 is coupled to the output pad 225, the output terminal 296 is coupled to the output pad 226, and the output terminal 299 is coupled to the output pad 229. Some embodiments of the packaged version 290 include circuitry, such as an analog multiplexer, analog low-pass filter, analog-to-digital converter, or other circuitry, mounted in the package 291 and coupled between the infrared detector 200 and the at least one output terminal 292-299.

Figure 3:
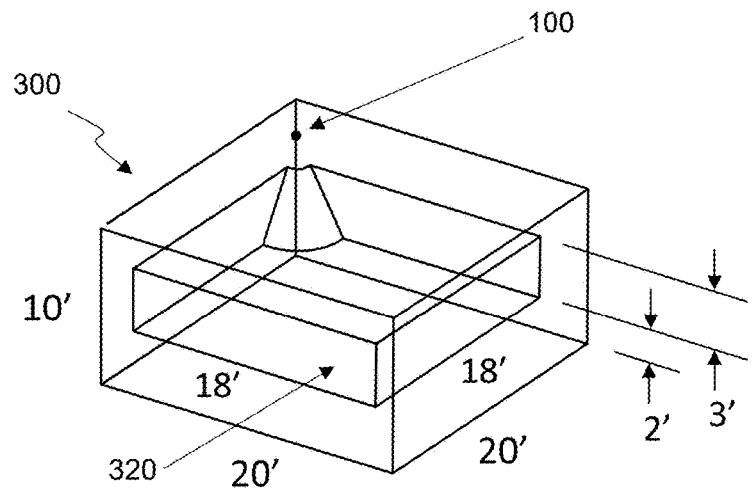
FIG. 3 shows a volume of interest in a typical room for an embodiment of the motion sensor.

FIG. 3 shows a volume of interest in a typical room 300 for an embodiment of the motion sensor. The room could be a family room, living room, bedroom, or any other room where an indication of occupancy or an indication that an intruder has entered is desired. In the embodiment, the motion sensor 100 is mounted 7.5 ft (2.3 m) above the floor, although depending on the room, it might be mounted at a different height such as 10 ft (3.0 m) with a reversible mounting bracket as shown in FIG. 9A-C, inter alia, of published International Patent Application WO2015/187326A1, or at any other height above the floor depending on the geometry of the fields of view, or monitored volumes, of the motion sensor 100 and desired volume of interest 320.

In this example, the volume of interest 320 is a volume bounded by a box with one edge in the corner of the 20 ft×20 ft (6.1 m×6.1 m) room 300 where the motion sensor 100 is located and extending out 18 ft (5.5 m) along each adjacent wall of the room 300 and covering the volume starting about 2 ft (0.6 m) from the floor to about 5 ft (1.5 m) from the floor. The motion sensor 100, acting as an occupancy sensor, can detect small amounts motion by a warm blooded animal, such as a human in the volume of interest 320, and send a notification that the room is occupied. The motion sensor 100, acting as an intrusion sensor, can detect a person walking through the volume of interest 320 and send an intrusion notification while not generating an intrusion notification for motion by small warm-blooded animals, such as a dog or a cat moving through the volume of interest 320. In some embodiments, a small portion of the cube bounding the volume of interest 320 in the corner near the motion sensor 100 may not be monitored due to the geometry of the fields of view of the motion sensor. 100.

Figure 4:
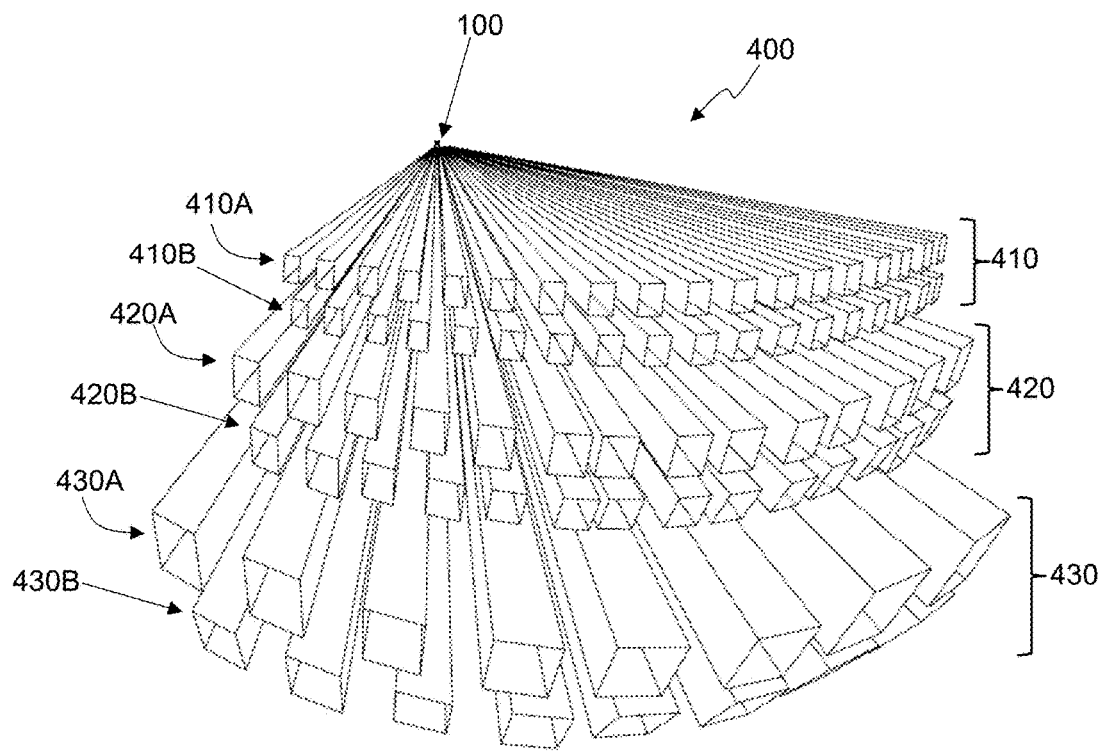
FIG. 4 depicts the 80 fields of view created by the 20 lens elements and 4 IR-detector elements of an embodiment.

FIG. 4 depicts the 80 fields of view 400 created by the 20 lens elements and 4 IR-detector elements of an embodiment of a motion sensor 100 such as shown in FIG. 1B. Each individual lens element directs IR radiation from a portion of the scene in front of the motion sensor 100 onto the IR detector 290, so that each element of the IR detector 290 has a unique field of view through each lens. The lenses create multiple tiers of monitored volumes where each tier has multiple rows of monitored volumes, such as the two rows per tier that are shown in FIG. 4. In many embodiments, tiers are substantially non-overlapping and the rows within each tier are substantially non-overlapping, with the rows within a tier shifted, or offset, from each other so that their monitored volumes are not vertically aligned with those of other rows within that tier.

In some embodiments, the IR detector array has multiple rows of IR-detector elements that are offset from each other and the optical system has a set of lenses for each tier. Each individual lens focuses on the entire multi-element surface of IR-detector array, creating separate fields of view for each IR-detector element through each lens of each tier. In those embodiments, it can be said that the offset between rows of monitored volumes, or fields of view, is created by the offset of the rows within the IR-detector array of the motion sensor. In the embodiment shown in FIG. 4, the offset between rows of monitored volumes, or fields of view, within each tier is created by the offset 233 of the two rows of IR-detector elements 212, 216 with the lenses in the optical system 110, 120, 130 each projecting onto the entire four IR-detector element surface of the IR detector array 290.

In other embodiments, the IR detector array has multiple rows of IR-detector elements that are substantially aligned with each other, and the optical system has a set of lenses for each row within each tier. Each individual lens focuses on a single row of IR-detector elements of the IR-detector array, creating separate fields of view for each IR-detector element within a single row through the lenses focused on that row within each tier. Each row's lenses are configured to create an offset between the fields of view of that row and the fields of view of other rows within a tier. In those embodiments, it can be said that the offset between rows of monitored volumes, or fields of view, is created by the configuration of the optical system of the motion sensor.

The top tier of 36 long-range volumes 410 is created by the long-range nine-lens array 110 projecting onto the four IR-detector elements on the IR-detector array 290. The nine-lens array 110 has a center of view angled down from the centerline of the motion sensor 100 by about 7°, and the 9 lenses of the array 110 are configured so that their individual centers-of-view have a pitch (i.e. centerline-to-centerline angle) of about 10° to cover an arc of about 90°. The middle tier of 28 mid-range volumes 420 is created by the mid-range seven-lens array 120 projecting onto the four IR-detector elements on the IR-detector array 290. The seven-lens array 120 has a center of view angled down from the centerline of the motion sensor 100 by about 23°, and the 7 lenses of the array 120 are configured so that their individual centers-of-view have a pitch of about 13° to cover an arc of about 90°. The bottom tier of 16 short range volumes 430 is created by the short-range four-lens array 130 projecting onto the four IR-detector elements on the IR-detector array 290. The four-lens array 130 has a center of view angled down from the centerline of the motion sensor 100 by about 42°, and the 4 lenses of the array 130 are configured so that their individual centers-of-view have a pitch of about 23° to cover an arc of about 90°. Note that in some embodiments, the motion sensor 100 itself will be mounted with its centerline at an angle below horizontal as discussed in published International Patent Application WO2015/187326A1. So if the motion sensor is mounted at an angle of 5° below horizontal, that angle is added to the vertical angle of each tier so that, in the embodiment shown, the long-range nine-lens array 110 is aimed 12° below horizontal, the mid-range seven-lens array 120 is aimed 28° below horizontal, and the short-range four-lens array 130 is aimed 47° below horizontal.

Other embodiments may use different optics and/or different IR detectors with different characteristics to create the rows of monitored volumes offset from each other such as those disclosed in published International Patent Application WO2015/088470A1. In embodiments the number of tiers may be based on the size of the desired volume of interest. For example, an embodiment for a motion sensor targeting a 33 ft (10 m) square volume of interest might use 5 sets of lenses to create 5 tiers of monitored volumes to keep the height and width of each monitored volume at the target height small enough that a human would intersect two monitored volumes as they move through the different portions of the volume of interest, but large enough that a medium-sized dog would only intersect a single monitored volume.

The number of lenses for each tier in some embodiments is selected to avoid having fields of view in adjacent tiers that are vertically aligned. The starting azimuth for the first field of view of each tier may differ in some embodiments to avoid aligned fields of view at the edges of the volume of interest. This may be combined with an adjustment of the horizontal pitch angle in some embodiments to ensure the final fields of view of the tiers are not aligned either. In some embodiments, adjacent tiers are created using lens arrays where the number of lenses in an array has no common factors with the number of lenses in an adjacent array. In some embodiments, each array of lenses has a number of lenses that shares no common factors with the number of lenses in any other array. This type of arrangement means that a row of monitored volumes in one tier shares only a common factor of 2 with a row of monitored volumes in another tier. In the embodiment shown, the first lens array 110 has 9 lenses, which is a multiple of 3, the second lens array 120 has 7 lenses, which is a prime number, and the third lens array 130 has 4 lenses, which is multiple of 2, so there are no common factors between the numbers of lenses in respective arrays.

At least one embodiment of a motion sensor 100 includes an infrared detector 290, as shown in FIG. 2D, comprising a first set of detector elements 212, a second set of detector elements 216, and an optical system that includes multiple subsections 110, 120, 130. A first optical subsystem 110 is included to direct infrared radiation from a first set of monitored volumes 410A spaced at a first pitch in a first direction onto the first set of detector elements 212, and to direct infrared radiation from a second set of monitored volumes 410B spaced at the first pitch in the first direction and offset from the first set of monitored volumes 410A in the first direction, onto the second set of detector elements 216. The first set 410A and the second set 410B each consist of a first number of monitored volumes. A second optical subsystem 120 is also included to direct infrared radiation from a third set of monitored volumes 420A spaced at a second pitch in the first direction onto the first set of detector elements 212, and to direct infrared radiation from a fourth set of monitored volumes 420B spaced at the second pitch in the first direction and offset from the third set of monitored volumes 420B in the first direction, onto the second set of detector elements 216. The third set 420A and the fourth set 420B each consist of a second number, different than the first number, of monitored volumes. A third optical subsystem 130 is also included to direct infrared radiation from a fifth set of monitored volumes 430A spaced at a third pitch in the first direction onto the first set of detector elements 212, and to direct infrared radiation from a sixth set of monitored volumes 430B spaced at the third pitch in the first direction and offset from the fifth set of monitored volumes 430B in the first direction, onto the second set of detector elements 216. The fifth set 430A and the sixth set 430B each consist of a third number, different than the second number and the first number, of monitored volumes.

Figure 5A:
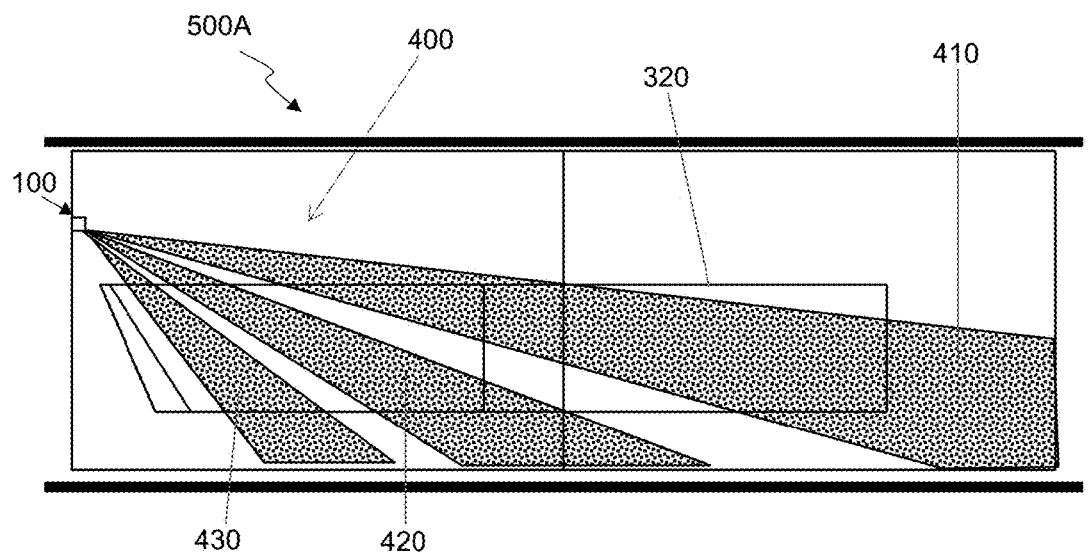
FIGS. 5A and 5B show the fields of view of the motion sensor of FIG. 1A/B intersecting with the volume of interest of FIG. 3.
Figure 5B:
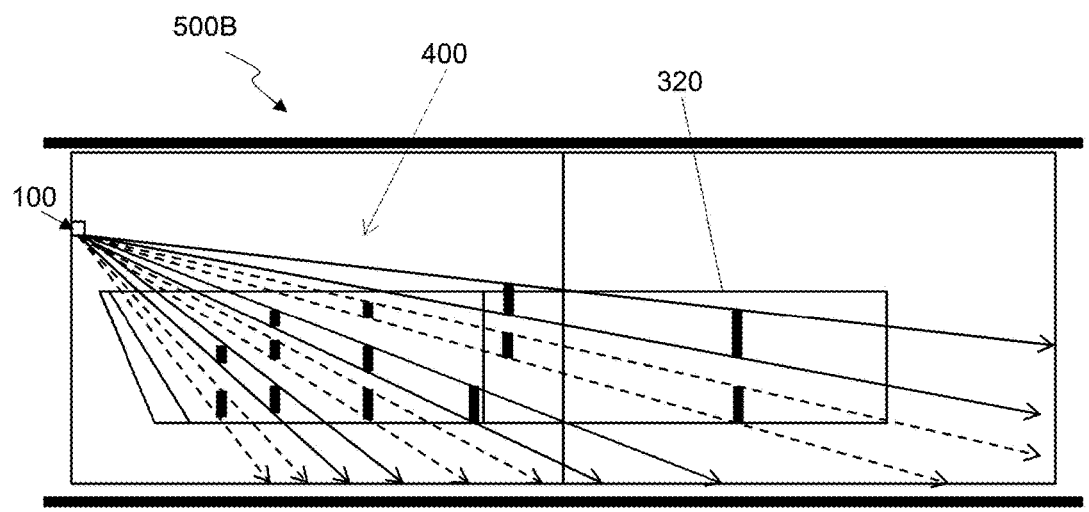

FIGS. 5A and 5B show the fields of view 400 of the motion sensor 100 intersecting with the volume of interest 320 of FIG. 4. The views 500A, 500B are along the motion sensor's 100 pointing axis, diagonal across the room, which is about 28' (8.5 m). The volume of interest 320, shown in cross-section is where persons are most likely to be moving and the fields of view 400 of the motion sensor 100 cover the various portions of the volume of interest 320. FIG. 5A shows the three tiers of monitored volumes, the top tier of long-range volumes 410, the middle tier of mid-range volumes 420, and the bottom tier of short-range volumes 430, intersecting the volume of interest 320.

FIG. 5B shows black vertical bars indicating the height of a monitored volume created by a single field of view out of the 80 fields of view 400 of the motion sensor 100 at particular points in the volume of interest 320. The geometry of the fields of view 300 create a relatively consistent field of view size in the room to so that there is consistent detection of minor motion throughout the volume of interest 320 due to the different focal lengths of the lens arrays 110, 120, 130. Note that as the longer range fields of view descend into the volume of interest 320, the monitored volumes created by those fields of view get larger to have nearly the same height as the short-range fields of view near the motion sensor 100.

Figure 6:
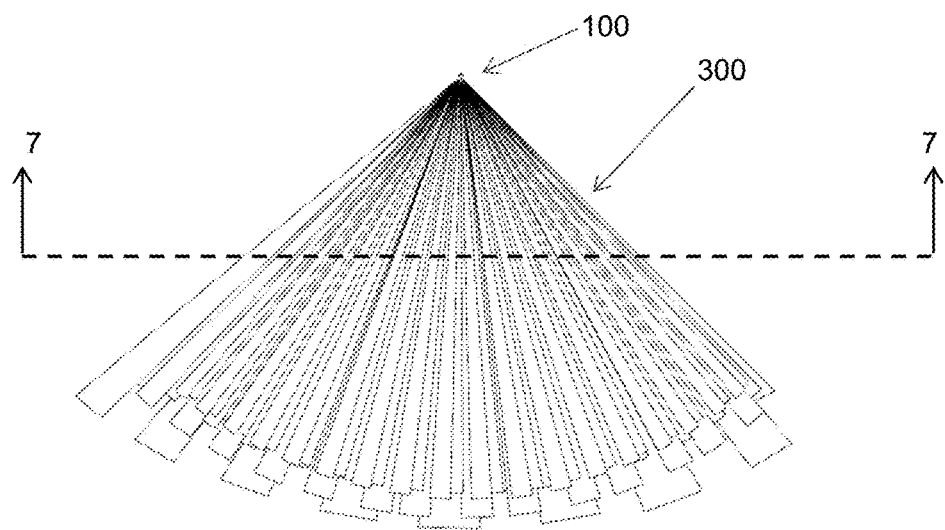
FIG. 6 shows a top view of the fields of view shown in FIG. 4.

FIG. 6 shows a top view of the fields of view 300 shown in FIG. 2 emanating from the motion sensor 100. The long-range fields of view 310 are above the mid-range fields of view 320 which are above the short-range fields of view 330. A cross-section line 7:7 indicates a location about 5 ft (1.5 m) from the motion sensor 100 perpendicular to the pointing axis of the motion sensor 100.

Figure 7:
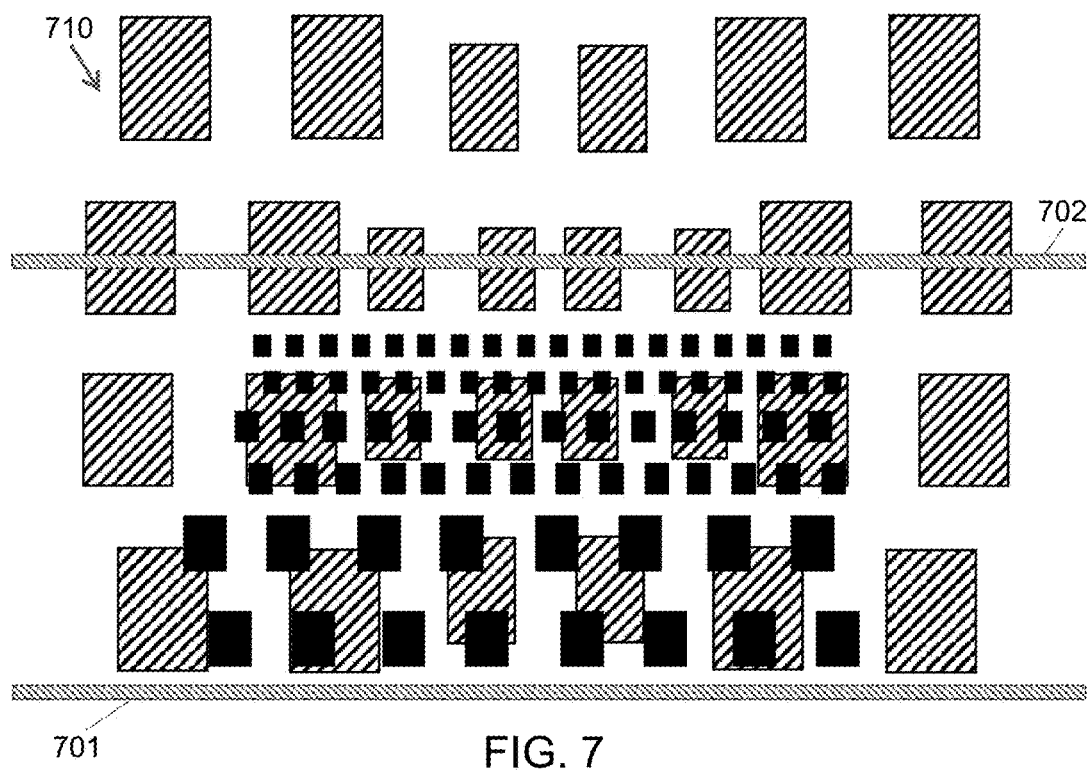
FIG. 7 shows a comparison of the fields of view of FIG. 6 compared to conventional motion sensor fields of view.

FIG. 7 shows a comparison of the fields of view 700 (solid fill), shown in cross section at the line 7:7 of FIG. 6, compared to conventional motion sensor fields of view 710 (hashed fill). Note that the fields of view 600 of the embodiments described herein are smaller higher in the room and larger lower in the room due to the differing focal lengths of the optics compared to the conventional fields of view 710, which are of a more uniform size at various heights due to uniform focal lengths of the optics. This allows the fields of view 700 to start small but as they radiate further out and down from the motion sensor 100, they expand in size to provide for more consistent detection of motion. The conventional fields of view 710 have many wasted fields of view, as they are aimed higher than the ceiling. The disclosed fields of view 700 pack more fields of view into the volume of interest.

Figure 8A:
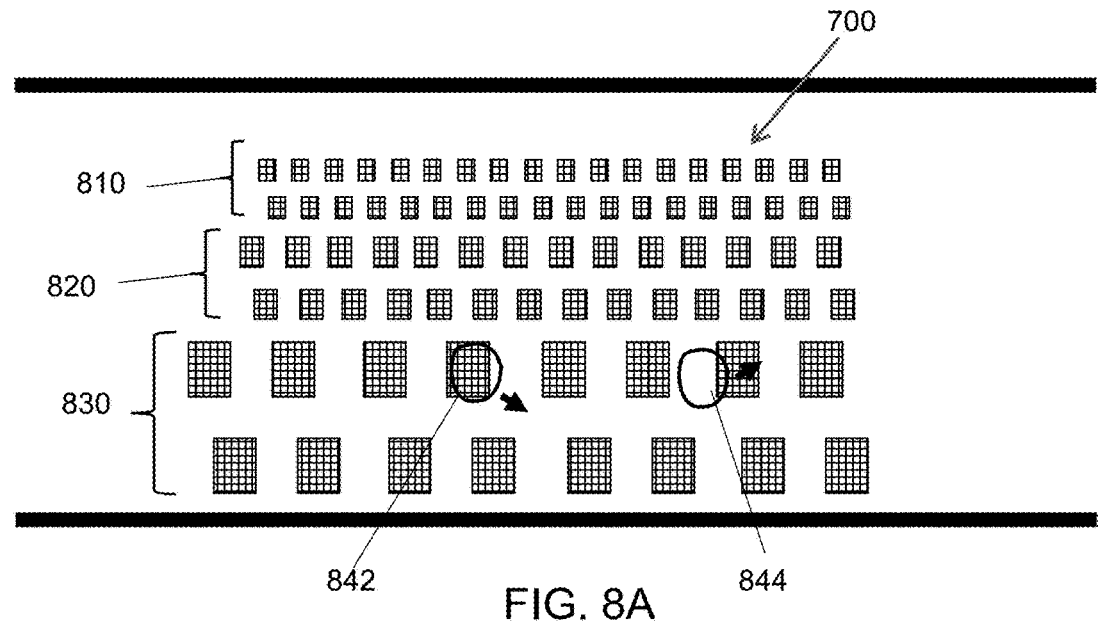
FIG. 8A shows sensitive minor-motion detection by the fields of view of FIG. 6.
Figure 8B:
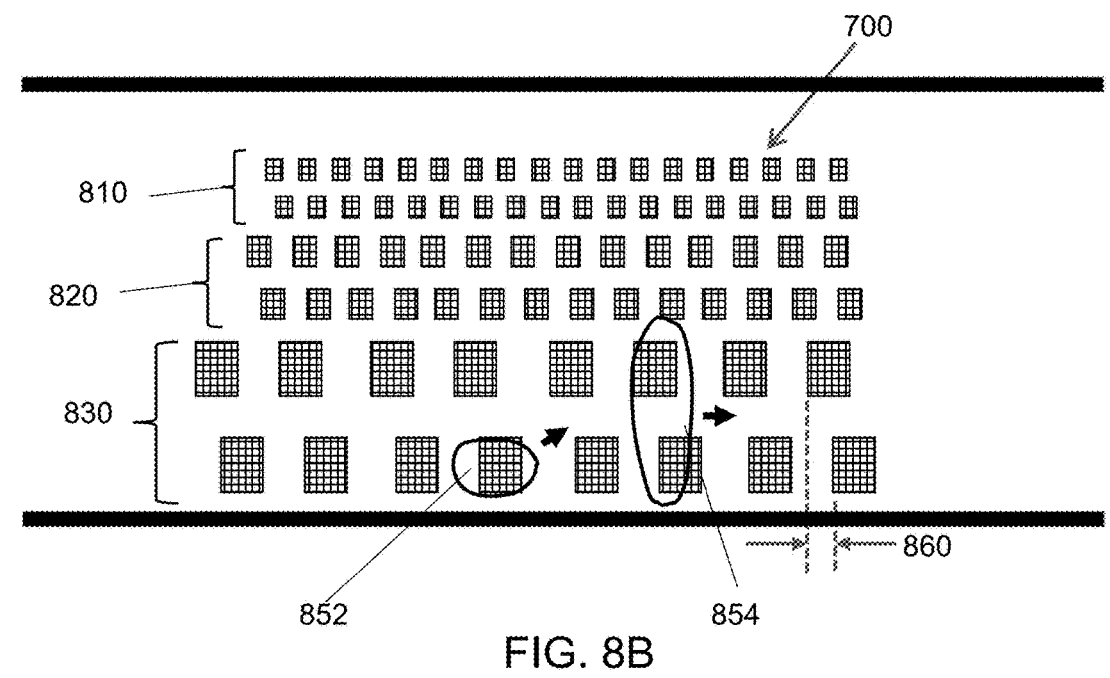
FIG. 8B shows pet-immune motion detection by the fields of view of FIG. 6.

FIG. 8A shows sensitive minor motion detection by the fields of view 700, which are the fields of view 300 shown in cross section at the line 7:7 of FIG. 6. Both FIGS. 8A and 8B show the long-range fields of view 810 are located above the mid-range fields of view 820 which are located above the short-range fields of view 830. As the distance from the motion sensor 100 increases, the short-range fields of view 830 will no longer intersect with the volume of interest, and the mid-range fields of view 820 and long-range fields of view 810 will descend into the volume of interest, and grow larger to cover the volume of interest. At longer ranges, the mid-range fields of view 820 will no longer intersect with the volume of interest, and only the long-range fields of view 810 will intersect with the volume of interest.

The motion sensor 100 can be used for minor-motion occupancy detection. Each field of view collects IR radiation and directs it onto a detector element. A "spot" of radiation, such as the first spot 842 or the second spot 844, from any main area of a human body, moving either into our out of any field of view, causes a temperature change on the IR-detector element and a change in the corresponding output signal, which is used for occupancy detection.

FIG. 8B shows pet-immune motion detection by the fields of view 700, which are the fields of view 300 shown in cross section at the line 7:7 of FIG. 6. A spot of IR radiation 852 caused by a pet, such as a cat or a dog, can only cause signals from a single field of view. Unlike in detection of occupancy, the spot of IR radiation 852 falling on a single field of view is not treated as detecting intrusion.

The spot of IR radiation 854 is caused by a human, which has enough height to intersect with two fields of view. This can be used to detect both occupancy and intrusion. The offset 860 between adjacent rows of fields of view can be used to differentiate between human motion and many sources of false alarms, as will be described in more detail below.

Figure 9:
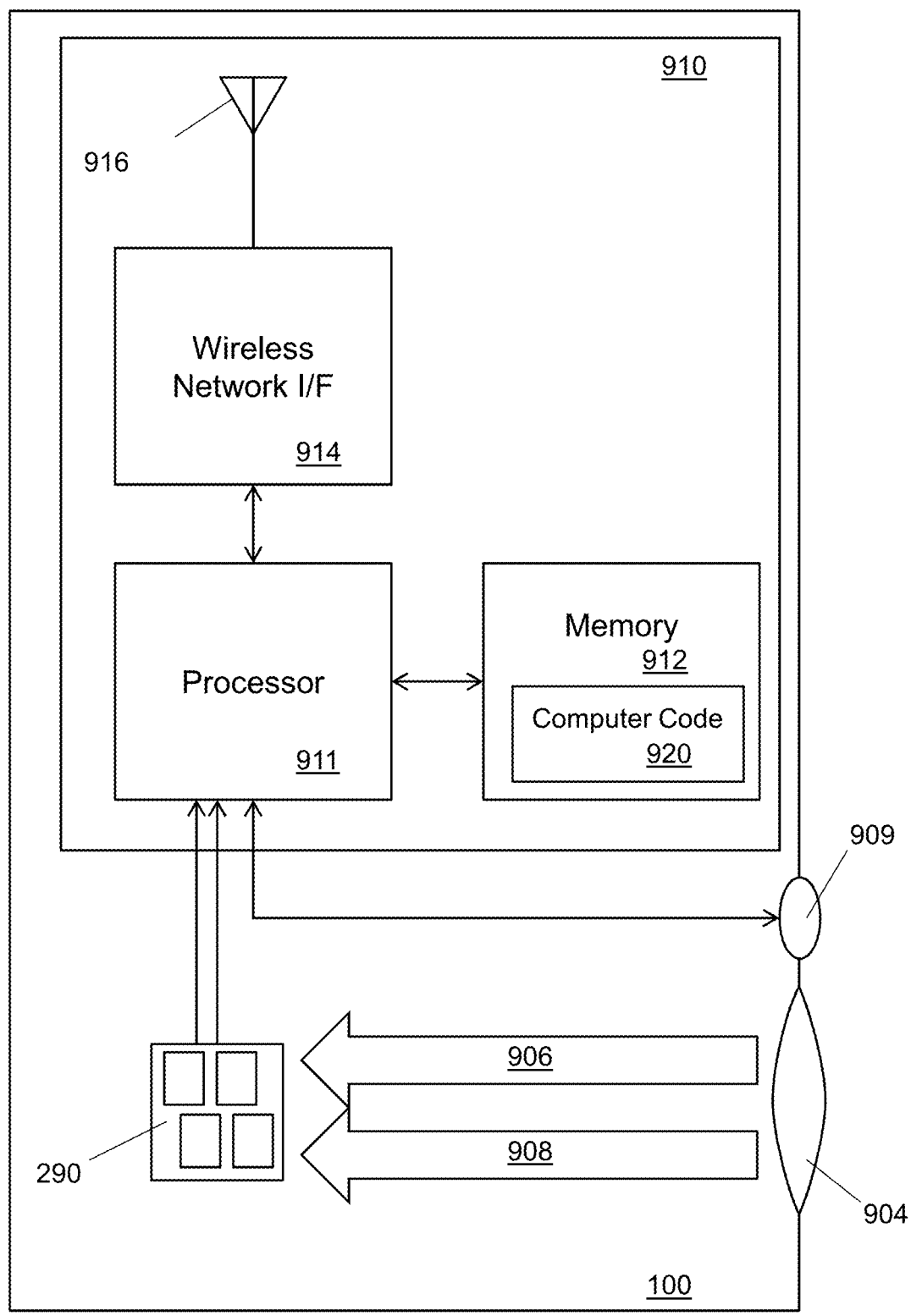
FIG. 9 is a block diagram of an embodiment of a motion sensor.

FIG. 9 shows a block diagram of an embodiment of a motion sensor 100. The motion sensor 100 includes an infrared detector 290 that has a first set of detector elements and a second set of detector elements. The motion sensor 100 also includes an optical system 904 to direct electromagnetic energy 906 from a first set of monitored volumes onto the first set of detector elements and to direct electromagnetic energy 908 from a second set of monitored volumes onto the second set of detector elements. In embodiments, the electromagnetic energy directed onto the detector elements includes infrared light. The first set of monitored volumes is spaced at a pitch, and the second set of monitored volumes is spaced at the same pitch. The second set of monitored volumes has an offset from the first set of monitored volumes in a direction parallel to the pitch. In some embodiments the optical system 904 creates the offset between the two sets of monitored volumes, and in some embodiments the offset between the two sets of monitored volumes is created by an offset between the two sets of detector elements on the infrared detector 290. The offset can be any percentage of the pitch, depending on the embodiment, but in some embodiments, the offset is a non-quadrature offset, e.g. the offset is not equal to 50% of the pitch. In some embodiments, the motion sensor 100 includes an ambient light sensor 909. The ambient light sensor 909 may have a separate window through the case of the motion sensor 100 or may have light from the optical system 904 directed to it.

The motion sensor 100 of the embodiment of FIG. 9 also includes circuitry 910 such as a processor 911 coupled to the infrared detector 290 and the ambient light sensor 909 if it is included. Memory 912, which can store computer code 920, is coupled to the processor 911 in embodiments, and the processor 911 can read the computer code 920 from the memory 912 and execute the computer code 920 to perform one or more of the methods described herein in some embodiments. A wireless network interface 914 is coupled to an antenna 916 as well as to the processor 911 to allow radio frequency messages to be sent and/or received by the motion sensor 100 over a wireless computer network such as, but not limited to, a Wi-Fi® network, a 6LoWPAN network, a Bluetooth® network, a Thread network, a Z-Wave® network, or a Zigbee® network. Other embodiments include different types of circuitry 910 that may or may not include a processor 911, but may include specialized hard-wired or specialized circuitry to perform one or more methods described herein. In at least one embodiment, a EFM32ZG110F32 integrated circuit (IC) from Silicon Laboratories, Inc.® is used, which includes a EFM32® Wonder Gecko MCU utilizing ARM® Cortex®-M0+ 32-bit microcontroller and 32 kilobytes (kB) of flash memory and 2 kb of random access memory (RAM), along with an NXP® JN5168 ZigBee and IEEE® 802.15.4 wireless microcontroller IC with a 32-bit RISC (reduced instruction set computing) CPU, 256 kB of flash memory, and 32 kB RAM. In this embodiment, the ARM microcontroller and the RISC CPU together constitute the processor 911, and the flash memory and RAM of both parts together constitute the memory 912. Wi-Fi is a registered trademark of the Wi-Fi Alliance, Bluetooth is a registered trademark of the Bluetooth Special Interest Group, Z-Wave is a registered trademark of Sigma Designs, Inc., Zigbee is a registered trademark of the Zigbee Alliance, Silicon Laboratories Inc., and EFM32 are registered trademarks of Silicon Laboratories, Inc., ARM and Cortex are registered trademarks of ARM Holdings, IEEE is a registered trademark of The Institute of Electrical and Electronic Engineers, Inc., and NXP is a registered trademark of NXP Semiconductors.

Figure 10:
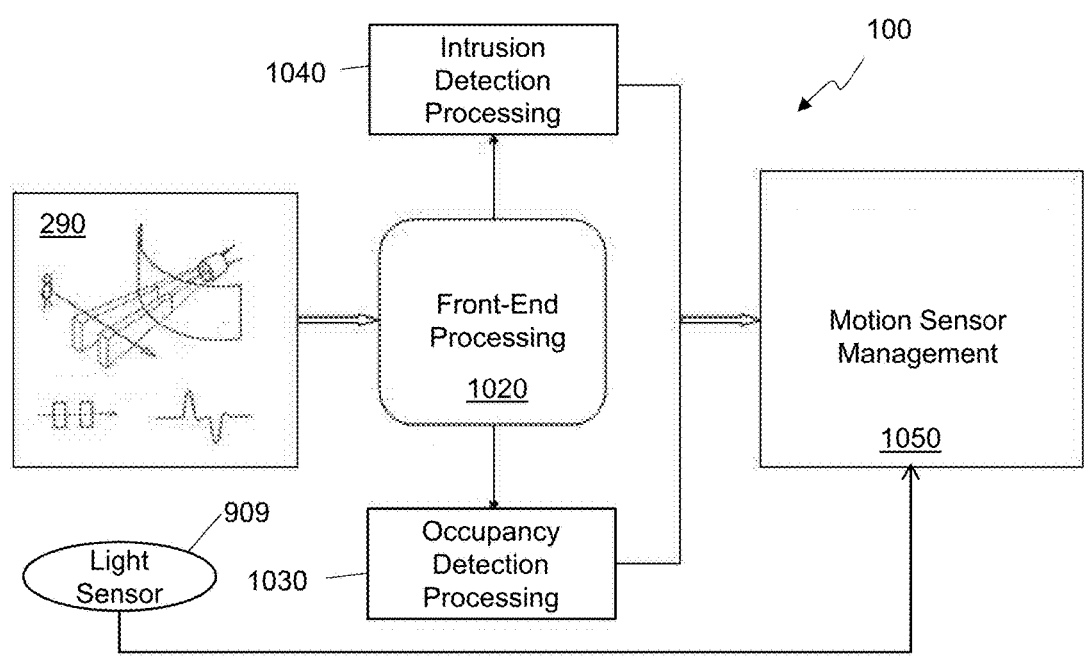
FIG. 10 is a high level data-flow diagram for an embodiment of a motion sensor.

FIG. 10 is a high level data flow diagram for the motion sensor 100. The IR detector 290 and the light sensor 909 are physical hardware devices that include one or more electronic circuit elements. The front-end processing block 1020, occupancy-detection processing block 1030, intrusion detection processing block 1040 and motion sensor-management block 1050 may be implemented in any combination of hardware and software, depending on the embodiment. In at least one embodiment, the front-end processing block 1020 is integrated with the IR detector 290 in a single package and the occupancy-detection processing block 1030, intrusion-detection processing block 1040 and motion sensor-management block 1050 are implemented using executable code running on one or more processors in the motion detector 100. In one embodiment, a single processor executes code for the occupancy-detection processing block 1030, intrusion-detection processing block 1040, and motion-sensor management block 1050. In another embodiment, the occupancy-detection processing block 1030 and the intrusion-detection processing block 1040 are implemented using code running on a first processor, such as the ARM processor of the EFM32ZG110F32 IC, and the motion sensor management block 1050 is implemented using code running on a second processor, such as the RISC CPU of the JN5168 IC.

As is also shown in the block diagram of FIG. 9, the motion sensor includes an IR detector 290 which has four IR-detector elements coupled to two output channels. The first output channel includes thermal information from a first set of monitored volumes, and the second output channel includes thermal information from a second set of monitored volumes. In at least one embodiment, the first set of monitored volumes includes the top row 310A of the long-range volumes 310, the top row 320A of the mid-range volumes 320, and the top row 330A of the short range volumes 330, and the second set of monitored volumes includes the bottom row 310B of the long-range volumes 310, the bottom row 320B of the mid-range volumes 320, and the bottom row 330B of the short-range volumes 330, which are all shown in FIG. 3. In a more generalized case, the first set of monitored volumes includes alternating rows of the monitored volumes of the motion sensor 100, such as the even rows, and the second set of monitored volumes has the interleaved rows, such as the odd rows.

The two output channels from the motion sensor provide data to the front-end processing block 1020 where they may be filtered in the analog and/or digital domain using high-pass filters, low-pass filters, band-pass filters, notch filters, or any other type of filter, sampled at a digital sample rate to convert the analog signal to a stream of digital samples, sample rate converted, converted into the frequency domain, processed in the frequency domain, converted back to the time domain, or otherwise processed in the analog or digital domain using any applicable signal processing technique. In at least one embodiment, the front-end processing 1020 subjects the analog signal from each channel of the IR detector to an analog low pass filter to remove frequencies higher than one half of an intended sample rate and sends the output of that filter to an Analog to Digital Converter (ADC) to sample the analog signals at that sample rate to convert the low-pass filtered IR detector channel signals to digital representations. In some embodiments, the front-end processing block 1020, such as the low-pass filter and ADC, may be integrated into the same package as the IR detector. The output of the front-end processing block 1020 is then sent to the occupancy-detection processing block 1030 and/or the intrusion-detection processing block 1040.

Occupancy-detection processing 1030 is enabled by the geometry of the monitored volumes created by the asymmetric tiers of optics of the motion sensor 100 and the offset pairs of IR detector elements of the IR detector 290 to cover the volume of interest in a room. The front-end processed channels of the IR detector 290 are passed from the front-end processing block 1020 to the occupancy detection processing block 1030. In some embodiments, the two channels of processed information from the IR detector 290 are mixed together, or summed, after the front-end processing 1020 at the input of the occupancy-detection processing block 1030, and the single mixed channel is further processed. In other embodiments, the two channels are processed independently and their detection determination combined using a Boolean OR function. The occupancy-detection processing 1030 may include any type of processing to determine a change in IR radiation received in either channel, including conversion between the analog and digital domain, sample rate conversion, sample rounding or truncation, analog and/or digital filtering including high pass filters, low pass filters, band-pass filters, notch filters, or any other type of filter, conversion between the time domain and frequency domain, or otherwise processed in the analog or digital domain using any applicable signal processing technique. In at least one embodiment, the two channels are separately processed using one or more high pass filters followed by one or more low pass filters. The output of the filtered channels is then compared to a pre-determined threshold and the results of the two channels ORed together to determine if the room is occupied. The occupancy determination made by the occupancy-detection processing block 1030 is then sent to the motion sensor management block 1050.

Intrusion-detection processing 1040 is also enabled by the geometry of the monitored volumes created by the asymmetric tiers of optics of the motion sensor 100 and the offset pairs of IR detector elements of the IR detector 290 to cover the volume of interest in a room. The front-end processed channels of the IR detector 290 are passed from the front-end processing block 1020 to the intrusion-detection processing block 1040. In at least some embodiments, the two channels are independently processed by the intrusion-detection processing block 1040 using any type of signal processing, including conversion between the analog and digital domain, sample rate conversion, sample rounding or truncation, analog and/or digital filtering including high-pass filters, low-pass filters, band-pass filters, notch filters, or any other type of filter, conversion between the time domain and frequency domain, or otherwise processed in the analog or digital domain using any applicable signal processing technique. In at least one embodiment, the two channels are separately processed using one or more high pass filters, followed by one or more low-pass moving average filters and then a high-pass filter to compensate for the frequency response of the IR detector 290. Then the output of the two channels are compared to determine if a large heat source, e.g. a human, has been detected, which can be interpreted to be an intrusion determination. An intrusion determination is then sent by the intrusion-detection processing block 1040 to the motion sensor management block 1050. In embodiments, the intrusion-detection processing 1040 is designed to minimize typical passive IR detector false-trigger sources. Various embodiments may utilize any combination of the disclosed processing methods.

In some embodiments, the intrusion-detection processing 1040 compares the two filtered channels by using a two-channel peak-alternation method to differentiate between a human and a small animal. A two-channel peak-alternation method can be implemented in many different ways, but it is a method that looks at a predetermined number of sequential peaks, both local minimums and local maximums, in the two input channels, and determines that a large warm body has been detected if at least a predetermined portion of the predetermined number of sequential peaks were alternating between the two channels.

In some embodiments, the intrusion-detection processing 1040 compares the two filtered channels using peak-slope synchrony test to further differentiate between a human and a small animal. A peak-slope synchrony test can be implemented in many different ways but it compares the slope of one channel to the slope of the other channel during a peak-to-peak time of one of the channels. If the slopes differ by more than a pre-determined factor, that is an indicator that the heat source may not be a large heat source, such as a human. The indicator can be used on its own in some embodiments for intrusion detection, but in other embodiments, the indication is used in conjunction with two-channel peak-alternation method, such as being used to decrement a counter keeping track of the number of alternating peaks.

The motion-sensor management block 1050 receives the indications from the occupancy-detection processing block 1030 and the intrusion-detection processing block 1040 and determines what action the motion sensor 100 should take. In some embodiments, the motion sensor 100 includes a light sensor 909 to detect ambient light levels which are then reported to the motion sensor management block 1050. The motion sensor management block 1050 may be configured using messages received through a network interface of the motion sensor 100, and/or through one or more input devices on the motions sensor 100, such as switches, dials, sliders, and the like. The configuration may include one or more settings, such as settings to enable/disable occupancy detection, enable/disable intrusion detection, enable/disable animal/human differentiation, determine which intrusion detection method(s) are used, enable/disable ambient light detection, and/or control any other aspect of the operation of the motion sensor 100. The motion sensor management block 1050 can then determine how to respond to the various indications from the occupancy-detection processing 1030, intrusion-detection processing 1040, and light sensor 909. Responses can include, but are not limited to, reporting on occupancy status, reporting on ambient light status, intrusion alarm notification, and other responses depending on the embodiment. Various mechanisms, in any combination, can be used by various embodiments for the responses, including, but not limited to, sending messages over a wired, wireless, or power-line network, activating an audio indicator such as a siren or a recording played over a speaker, activating an optical indicator such as a flood light, strobe light, or LED, opening or closing a switch coupled to an external circuit, or any other way of responding.

Figure 11:
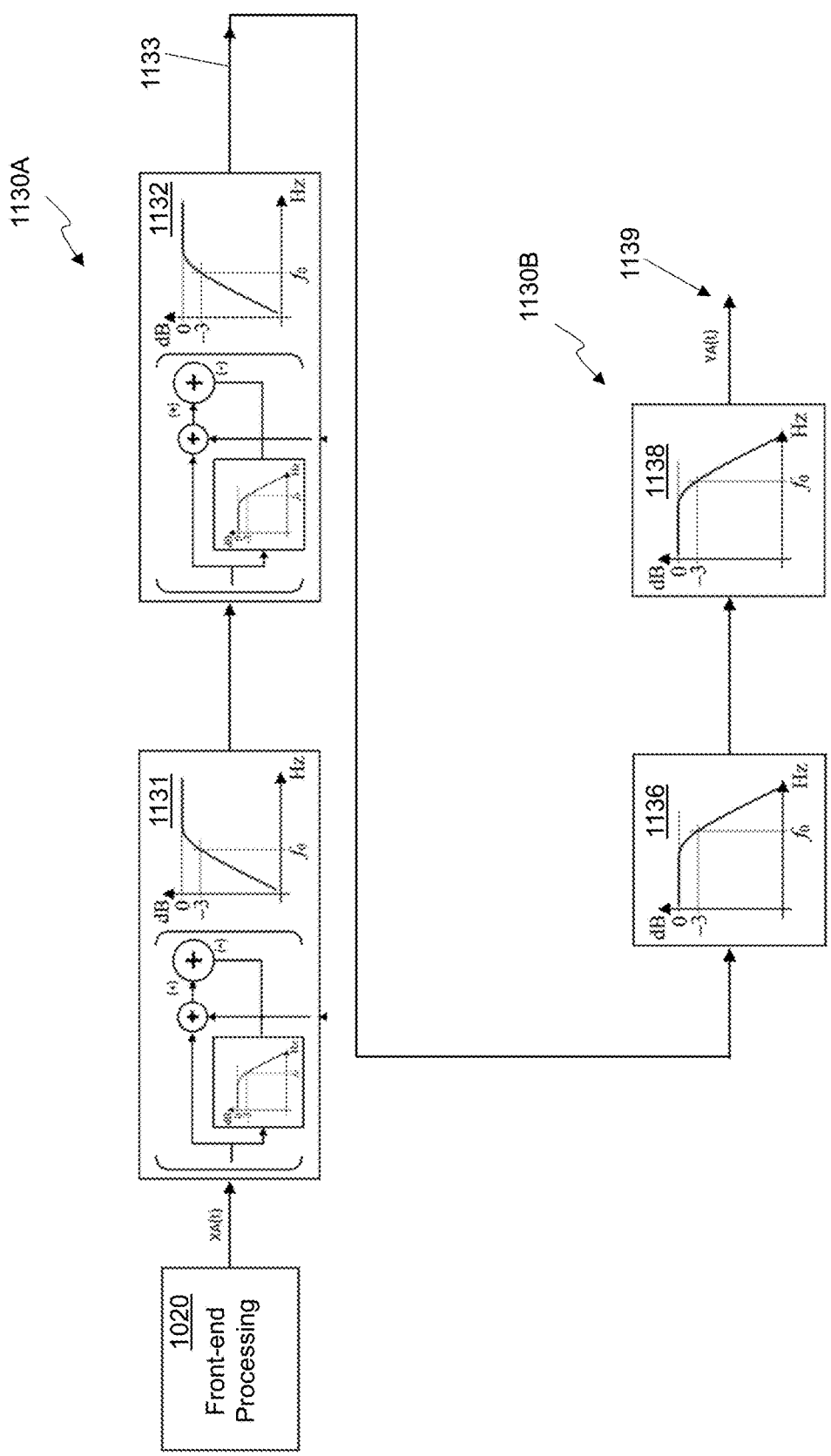
FIG. 11 shows a signal-processing diagram for an embodiment of the occupancy detection processing block.

FIG. 11 shows a signal-processing diagram for an embodiment of the occupancy detection processing block 1030. The signal processing shown in FIG. 11 is targeted at a specific embodiment having an IR detector with specific properties, an optical system with specific properties, and a processor with particular capabilities. Other embodiments may vary significantly in the details of the signal processing and may use different bit resolutions and/or data formats, different parameters for the filters, different filters, or different processing altogether to condition the signals from the front-end processing block 1120 to prepare them for occupancy detection.

In the embodiment shown, the front end processing block 1120 provides two channels of digital data at 14 bits per sample with a value of 2000 hexadecimal (h) representing about 0 volts. Depending on the embodiment, the two channels may be individually processed as shown in FIG. 11 or they may be combined, added, or averaged to create a single channel of data which is then processed as shown in FIG. 11. In the embodiment shown, each channel is individually processed, but because the processing of the two channels is equivalent, the discussion herein will only address a single channel.

The 14-bit output samples from the front-end processing block 1020 are provided about every 10 milliseconds (ms) (i.e. 100 Hertz) to an exponential average high-pass filter 1131 using a 6-bit shift leading to −3 decibel (dB) cut-off frequency (hereafter simply referred to as a cut-off frequency) of 0.25 Hertz (Hz). The exponential-average high-pass filter 1131 of this embodiment actually utilizes an exponential average low-pass filter to filter the stream of samples provided at the input to the filter block 1131, and the low-pass filtered input is then subtracted from the input stream, with a baseline input added to it because the input is unsigned, to create the high-pass filtered output. Although the 6-bit shift would have the potential to generate a 20-bit result from the 14-bit input samples, the output is truncated back to 14 bits to keep the stream at a meaningful resolution.

The output of the exponential high-pass filter 1131 is then sent through another exponential high-pass filter 1132, which in this embodiment is identical to the first exponential high-pass filter 1131. This is done to sharpen the low-frequency roll-off of the signal. The output of the second exponential high-pass filter 1132, output 1133, is then sent as input to an exponential average low-pass filter 1136 using a 2-bit shift leading to a cut-off frequency of 4 Hz. The output of the low-pass filter 1136 is sent to the second low-pass filter 1138, which in this embodiment is identical to the first low-pass filter 1136. In this embodiment, the additional two bits of output resolution of the two low-pass filters 1136, 1138 are kept, providing a 16-bit sample to the second low-pass filter 1138 which then outputs an 18-bit sample as the output 1139. The effect of the signal processing is to generate a band-pass filtered version of the IR detector channel between about 0.25 Hz and about 4 Hz.

The output 1139 is then compared against a predetermined threshold to determine whether the volume of interest monitored by the motion sensor 100 is occupied or not. If the output 1139 is greater than the predetermined threshold, an occupancy indication is sent to the motion sensor management block 1050. If the second channel of the IR detector is processed separately, there can be two different sources for the occupancy indication, one from each channel's processing. The predetermined threshold for a particular embodiment can depend on many different factors including the electrical noise in the system, the sensitivity of the IR detector, and the desired sensitivity for detection of occupancy by the motion sensor, but in at least one embodiment, the predetermined threshold is about 00060h (as an 18-bit number).

Figure 12:
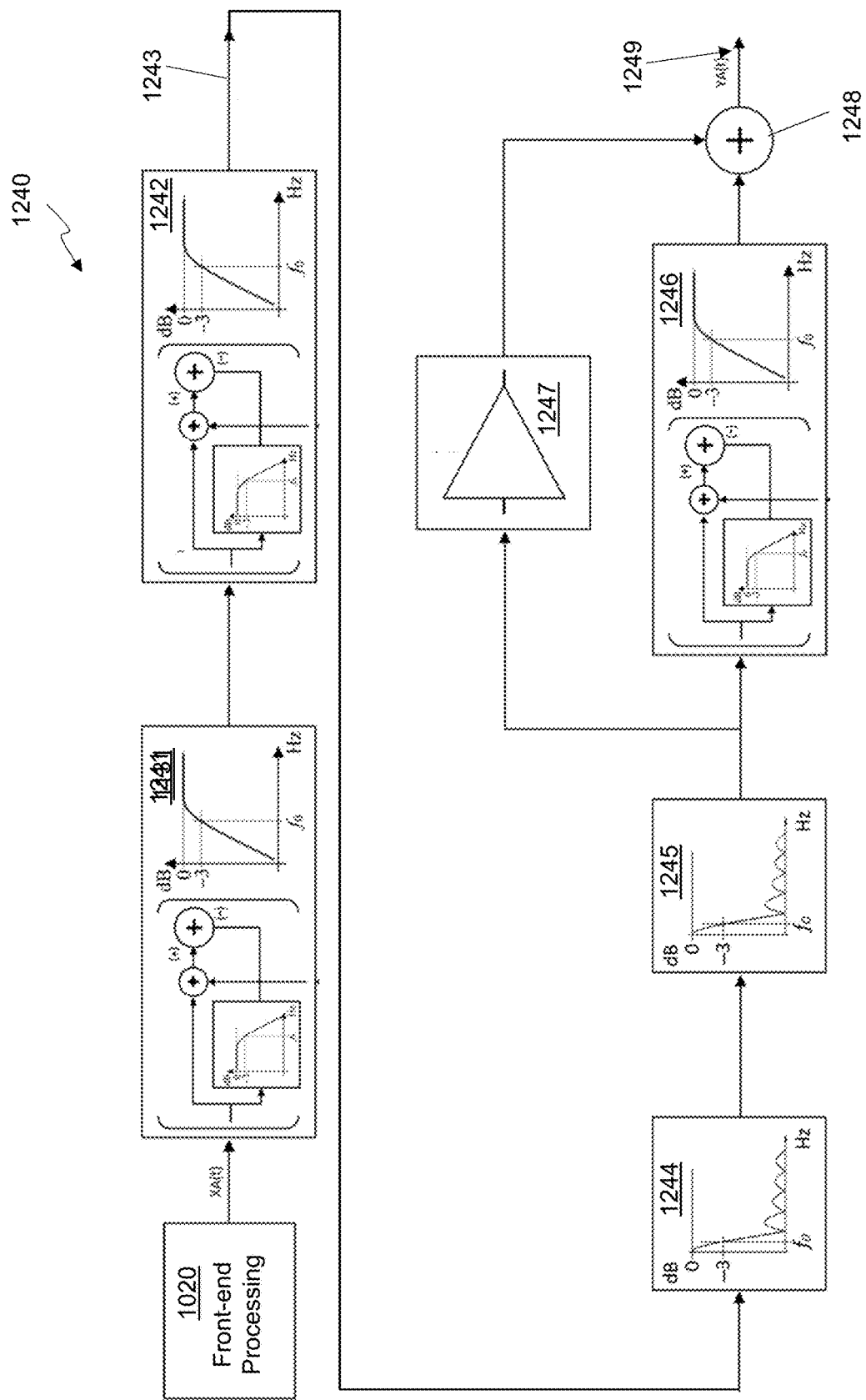
FIG. 12 shows a signal-processing diagram for an embodiment of the intrusion detection processing block.

FIG. 12 shows a signal processing diagram for an embodiment of the intrusion-detection processing block 1040. The signal processing shown in FIG. 12 is targeted at a specific embodiment having an IR detector with specific properties, an optical system with specific properties, and a processor with particular capabilities. Other embodiments may vary significantly in the details of the signal processing and may use different bit resolutions and/or data formats, different parameters for the filters, different filters, or different processing altogether to condition the signals from the front-end processing block 1020 to prepare them for intrusion detection.

In the embodiment shown, the front end processing block 1020 provides two channels of digital data at 14 bits per sample with a value of 2000h representing about 0 volts. The two channels both are individually processed as shown in FIG. 12, but because the processing of the two channels is equivalent, the discussion herein will only address a single channel.

The 14-bit output samples from the front-end processing block 1020 are provided about every 10 ms to an exponential average high-pass filter 1241 using an 8-bit shift leading to a cut-off frequency of 0.06 Hz. The exponential average high-pass filter 1241 of this embodiment actually utilizes an exponential average low-pass filter to filter the stream of samples provided at the input to the filter block 1241, and the low-pass filtered input is then subtracted from the input stream, with a baseline input added to it because the input is unsigned, to create the high-pass filtered output. Although the 8-bit shift would have the potential to generate a 22-bit result from the 14-bit input samples, the output is truncated back to 14 bits to keep the stream at a meaningful resolution.

The output of the exponential high-pass filter 1241 is then sent through another exponential high-pass filter 1242, which in this embodiment is identical to the first exponential high-pass filter 1241. This is done to sharpen the low-frequency roll-off of the signal. The output of the second exponential high-pass filter 1242, output 1243, is then sent as input to a moving-average low-pass filter 1244 using 4 samples for the average leading to a cut-off frequency of 5.6 Hz. A moving average low-pass filter is used because it tends to smooth the waveform as compared to an exponential-average filter. The output of the low-pass filter 1244 has 16 bits which is sent at that resolution to a second moving-average low-pass filter 1245, which in this embodiment is identical to the first moving-average low-pass filter 1244 other than because it takes 16-bit input samples, it has an 18-bit output.

The output of the second low-pass filter 1245 is then sent to an exponential-average high-pass filter 1246 using a 3-bit shift leading to a 2 Hz cut-off frequency. Because the input to this filter 1246 is 18 bits, the output is truncated to 18 bits. The purpose of the exponential high pass filter 1246 is to compensate for the frequency response of the IR detector of this embodiment, which rolls off as frequency increases. Very low frequency response, near the 0.06 Hz cut-off frequency of the high-pass filters 1241, 1242 earlier in the signal-processing pipeline, is impacted by high-pass filter 1246, so to compensate for that, the output of the low-pass filter 1245 is divided by 8 (shifted by 3 bits) by the bypass amplifier 1247 whose output is then added 1248 back to the output of the high-pass filter 1246 to create a filtered channel output 1249. The effect of this processing is to generate a band-pass filtered version of the IR detector channel between about 0.06 Hz and about 5.6 Hz that has been compensated for the frequency response of the IR detector to provide a flat response.

The output 1249 for each signal-processing channel is then provided for additional processing to determine whether or not a human is passing through the fields of view of the motion detector, which can be interpreted as an intrusion. FIG. 13 and FIG. 14A-C provide embodiments for analyzing the two channels of filtered IR detector output for detecting an intruder, i.e. a human, without generating an intrusion indication for movements of pets, such as cats and dogs.

Figure 13:
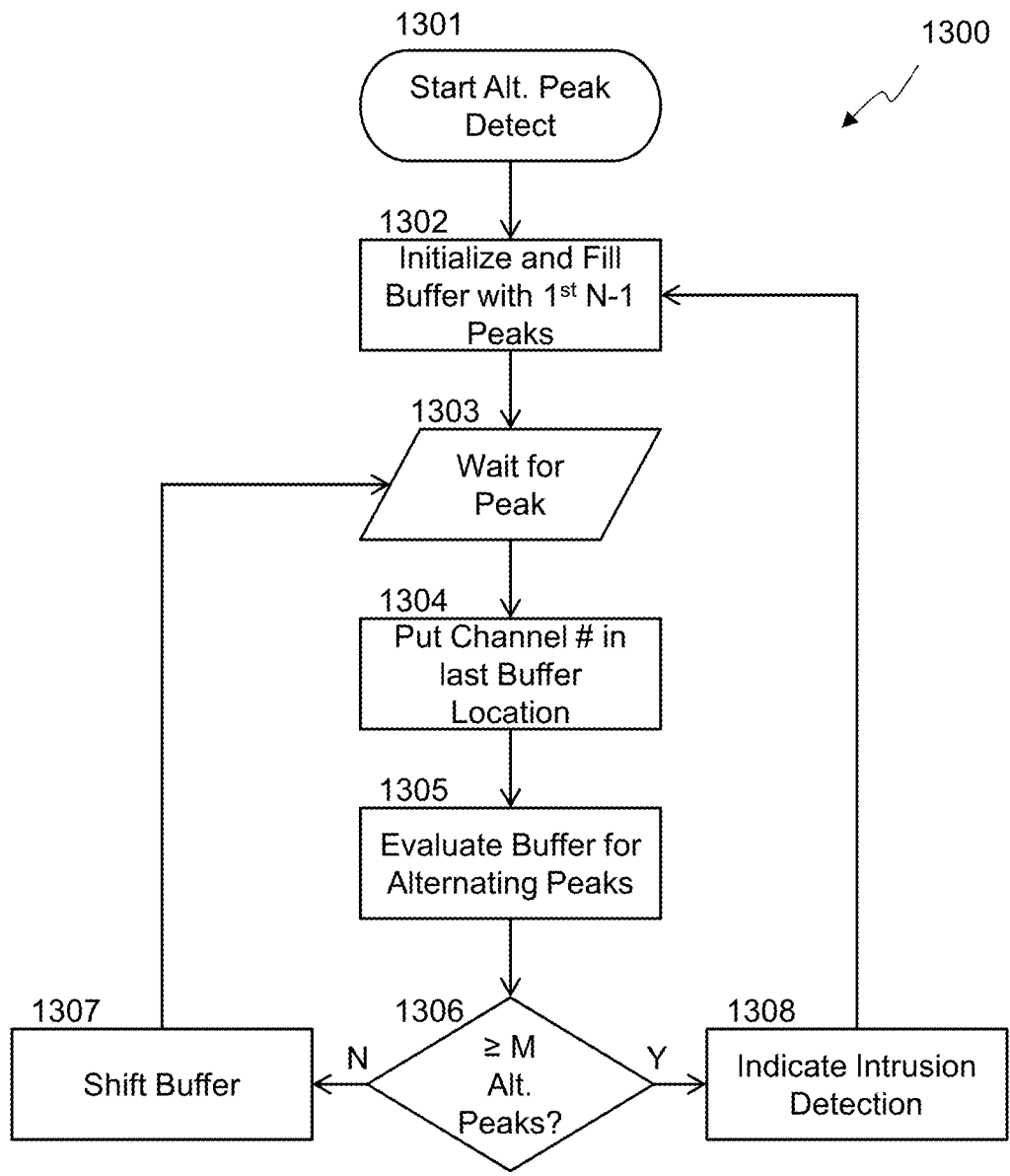
FIG. 13 is a flow chart of an embodiment of a peak-alternation method for intrusion detection.

FIG. 13 is a flow chart 1300 of an embodiment of a peak-alternation method for intrusion detection. The method shown in flow chart 1300 is targeted for use in a motion sensor using an IR detector with a plurality of outputs, such as the IR detector 290 shown in FIG. 2 which has two outputs. Other embodiments may use an IR detector with more than two outputs. Peaks are detected in each of the outputs where peak can be a local minimum or a local maximum. In some embodiments, hysteresis is employed to detect the peaks, meaning that the voltage of the signal must retreat from the local maximum/minimum by a predetermined amount, which can be an absolute value or a percentage of the maximum/minimum, before a peak is determined. The peak determination may be done by a separate process running on the CPU, or may be integrated with the code for performing the method of flow chart 1300.

A set of peaks in the plurality of outputs of the IR detector are selected and an alternation score is calculated based on a number of alternating peaks in the set of peaks. An intrusion detection is indicated, based, at least in part, on the alternation score. The method of flowchart 1300 uses a moving window to select the last N peaks for evaluation. The evaluation counts the number of peaks of the last N peaks that were on a different channel than the previous peak to calculate an alternation score. If the alternation score is M or greater, an intrusion detection is indicated to the motion sensor management block 1050. The values of N and M can be any number, depending on the embodiment, although M must always be less than N. In some embodiments, the value for N is between 4 and 20 and the value for M is between 20% and 80% of N. In at least one embodiment, the value for N is 9 and the value for M is 4. Higher values of N mean that the intruder must move within a volume of interest for a longer period of time to be detected, and lower values of M increase the sensitivity of the motion detector to intrusion but also increase the chance for a false intrusion detection.

The flowchart 1300 starts at block 1301 and then moves to block 1302 to initialize and fill the first N−1 locations with the channel number of successive peaks. Once this has been done, the method waits for the next peak on any channel at block 1303. Once a peak has been detected, the channel number of that peak is stored in the Nth buffer location at block 1304. The buffer is evaluated at block 1305 by counting the number of locations in the buffer that have a different channel number than the previous buffer location to determine an alternation score. Other embodiments can utilize other methods of determining an alternation score based on a number of alternating peaks in the set of peaks. The alternation score is compared to a predetermined threshold, M, at block 1306. If the alternation score is less than M, the method continues at block 1307 where each location of the buffer is moved to the previous location in the buffer, discarding the oldest peak channel number and leaving room for the next peak channel number to be put into the buffer. The method then goes back to block 1303 to wait for the next peak.

If the alternation score was greater than or equal to M at block 1306, an intrusion detection is indicated at block 1308 to the sensor-management block 1050, which can take whatever action is appropriate based on the configuration of the motion sensor 100. Once the intrusion detection has been indicated the method continues by returning to block 1302 to reinitialize the buffer, but in other embodiments, the method may go to block 1307 to shift the buffer, leaving the most recent N−1 peak channel numbers in place. Then either embodiment will return to block 1303 to wait for the next peak.

Figure 14A:
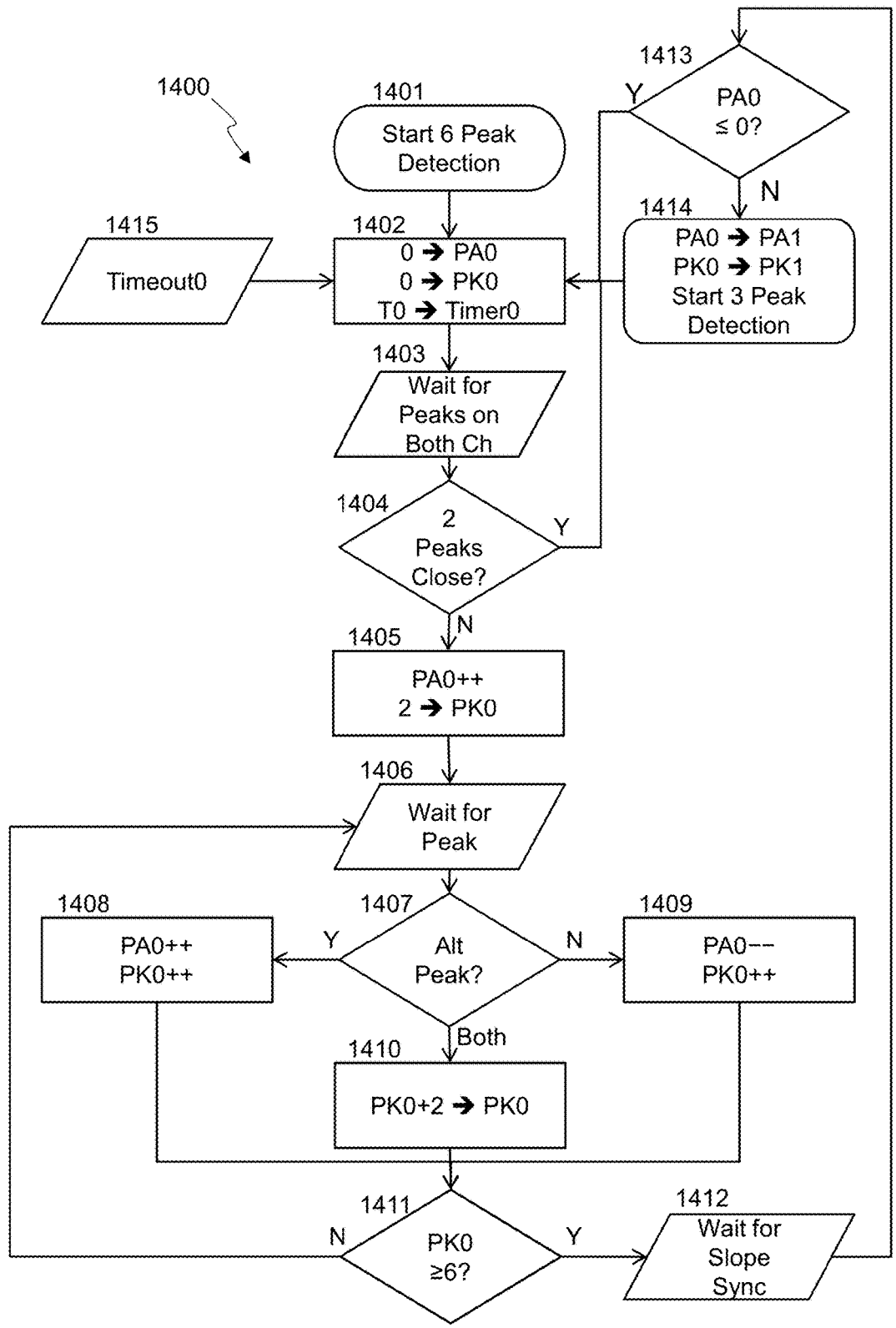
FIGS. 14A, 14B, and 14C provide a set of flow charts for an embodiment of a peak-alternation with slope-synchrony method for intrusion detection.
Figure 14B:
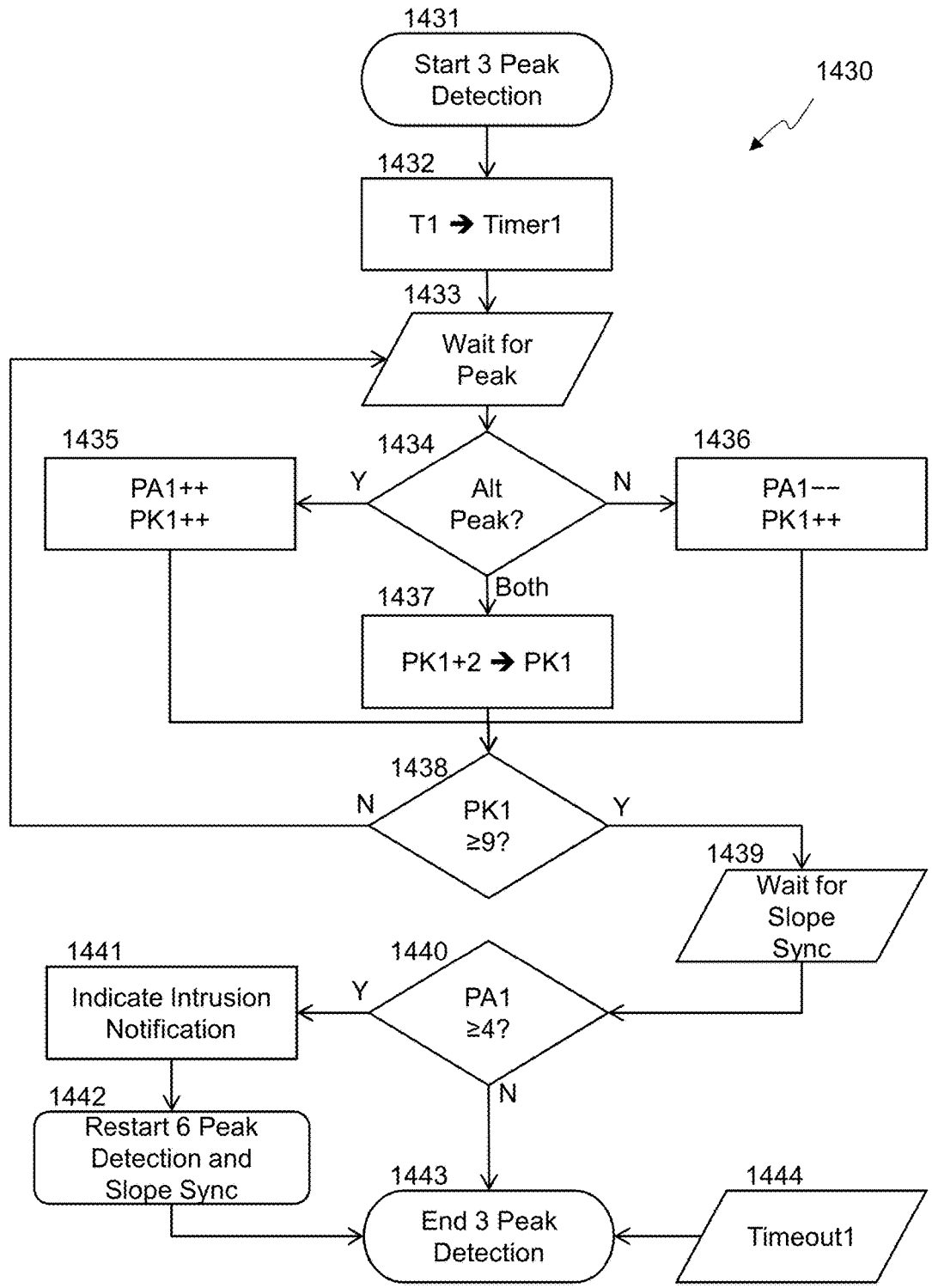
Figure 14C:
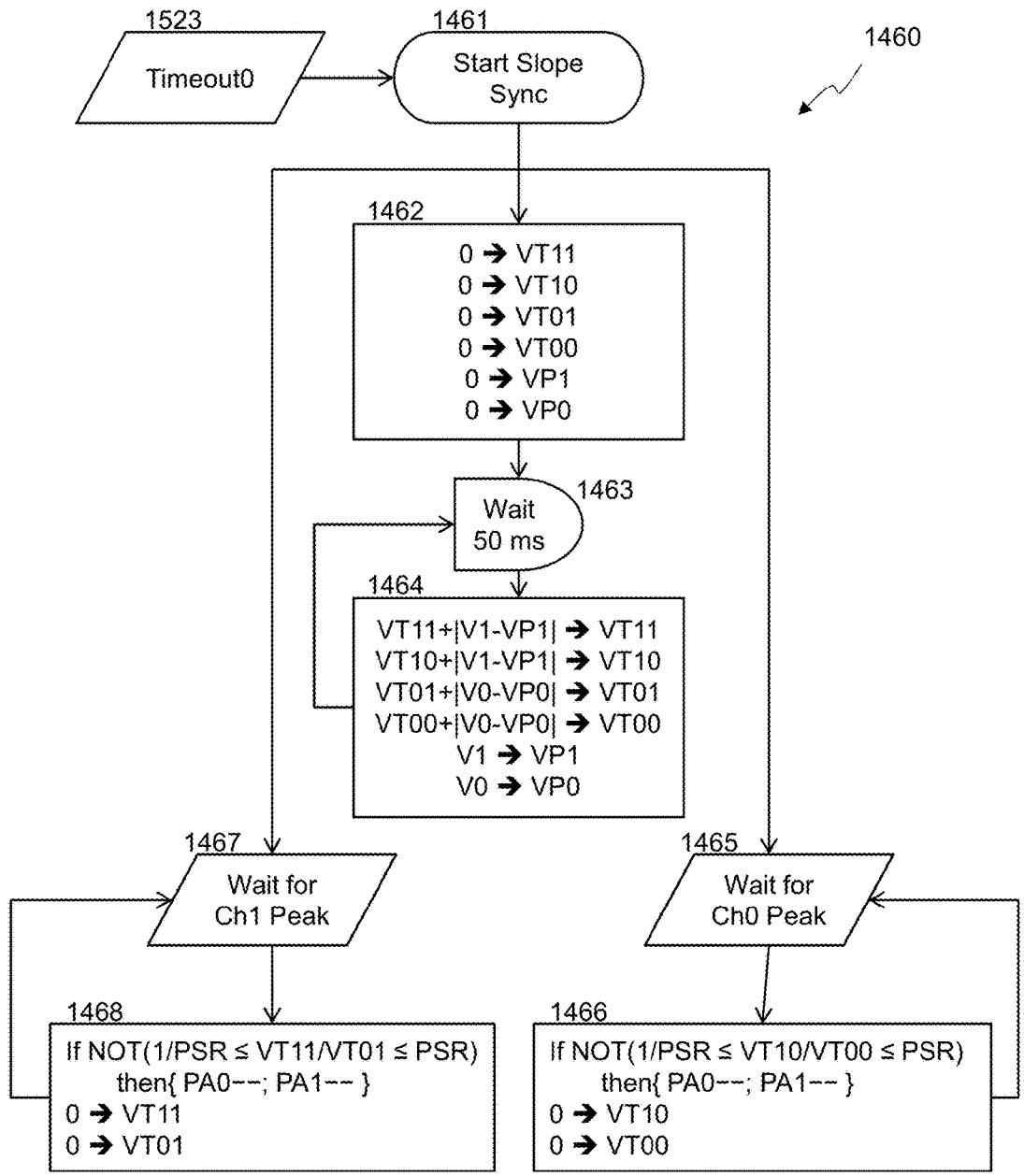

FIGS. 14A, 14B, and 14C provide a set of flow charts 1400, 1430, 1460 for an embodiment of a peak alternation with slope-synchrony method for intrusion detection. Each of the three flow charts may run as an independent process on the CPU, along with a process for peak detection, or they may all be integrated into a single process or any number of independent processes, depending on the embodiment.

FIG. 14A shows a flow chart 1400 for detecting 6 peaks in the channels and starts at block 1401. Variables are initialized at block 1402, including setting a PA0 variable, which is used to track a number of alternating peaks and is used to accumulate the alternation score for this method, to 0 and setting a PK0 variable, which is used to track a number of detected peaks, to 0. A timeout variable, Timer0, is also initialized to a timeout value T0 at block 1402. Different embodiments can utilize different timeout mechanisms. In one embodiment, the Timer0 variable is reset to T0 every time that a peak is recognized, so that if the gap between any two peaks is more than T0, the Timeout Block 1415 forces the method back to block 1402 which reinitializes the variables and starts the method over again. For embodiments such as these, the timeout may typically be set in a range of about 1 second (s) to about 5 s, depending on the embodiment. In other embodiments, the timeout is set to a time for the entire 6-peak process to complete, which is what is shown in FIG. 14A. So if the entire 6-peak process does not complete before the timeout period expires, block 1415 forces the method back to block 1402 which reinitializes the variables and starts the method over again. For embodiments such as these, the timeout period is longer and may typically be set in a range of about 5 s to about 20 s, depending on the embodiment.

After the variables are initialized at block 1402, the method proceeds to block 1403 where it waits until at least one peak has been detected on each channel. Once a peak has been detected on each channel, the last two detected peaks are evaluated at block 1404 to determine if they are close enough together that the channels can be considered to be in-phase with each other. The last two detected peaks are on separate channels because block 1403 was waiting until a peak was detected on both channels, so the channel having the last peak had not had a peak before; thus the previous peak was on a different channel. The measure for closeness may vary depending on the embodiment, but can be a fixed time, or a dynamic time calculated by the motion sensor based on history such as a percentage of the last peak-to-peak period of one of the channels, which may also be referred to as an interpeak period. If it is determined that the two peaks are close together, the method returns to block 1402 to reinitialize variables and start over.

If the two peaks are determined to not be too close to each other at block 1404, the method continues to block 1405 where the PA0 variable is incremented because the two pulses were known to be alternating, as described above, and the PK0 variable is set to 2 because two pulses have been detected. The method then continues to block 1406 to wait for the next peak.

Once a peak is detected at block 1406, it is checked to see if the peak is on a different channel than the previous peak at block 1407. If the peak is on a different channel, the PA0 variable and the PK0 variable are both incremented by one at block 1408 because a new peak was detected and it was alternating. If the peak was on the same channel as the previous peak, the PA0 variable is decremented by one and the PK0 variable is incremented by one at block 1409, because a peak was detected but it was not alternating, so a penalty is imposed on the alternation score. In the case where two peaks are detected at the same sampling time, the PA0 variable is left unchanged, and the PK0 counter is incremented by 2 at block 1410 because it is unclear in what order the two peaks actually occurred. Once the PA0 variable and the PK0 variable have been updated, the PK0 variable is checked at block 1411. If the PK0 variable is less than six, the method returns to block 1406 to wait for the next peak.

If, however, the PK0 variable is greater or equal to six, the method may optionally proceed to block 1412 before continuing to block 1413. Block 1412 is a synchronization block to ensure that the slope-synchrony calculation process shown in flowchart 1460 has completed its post-peak processing before continuing. Not all embodiments include slope-synchrony calculation, so those embodiments would skip block 1412. Some embodiments may integrate the slope-synchrony calculation method with the 6-peak detection method, so those embodiments would also skip block 1412 as no synchronization is necessary.

Once it is known that the slope-synchrony calculation process 1460 has completed its post-peak processing or there is no need for synchronizing with a slope-synchrony calculation process 1460, the PA0 variable is checked at block 1413. If that variable is not greater than zero, no intrusion detection will be indicated at this time, so the method continues to block 1402 to reinitialize variables and start over. If, however, PA0 is greater than zero, the method continues to block 1414 where the value of PA0 is transferred to PA1, the value of PK0 is transferred to PK1, and the 3-peak detection process of flowchart 1430 is started before the method of flowchart 1400 proceeds to block 1402 where its variables are reinitialized and the 6-peak detection process starts over.

FIG. 14B shows a flow chart 1430 for detecting 3 peaks in the channels and starts at block 1431 with its PA1 and PK1 variable pre-initialized by the 6-peak detection process shown in flow chart 1400. In some embodiments, the method continues to block 1432 where a separate timer is initialized for the 3-peak detection process. The value of the time may vary between embodiments, but it may be set between about 3 seconds and about 10 seconds in some embodiments. If the Timer1 timeout expires before the 3-peak detection method of flow chart 1430 is completed, block 1444 will end the process at block 1443. In some embodiments, if the timeout from the 6-peak detection process 1400 expires, it may also end the 3-peak detection process 1430.

After the timer has been initialized at block 1432, the method proceeds to block 1433 to wait for the next peak. Note that because the 3-peak detection process 1430 and the 6-peak detection process 1400 run concurrently, any peak detected by the 3-peak detection process will also be detected by the 6-peak detection process. Once a peak has been detected at block 1433, it is checked to see if the peak is on a different channel than the previous peak at block 1434. If the peak is on a different channel, the PA1 variable and the PK1 variable are both incremented by one at block 1435 because a new peak was detected and it was alternating. If the peak was on the same channel as the previous peak, the PA1 variable is decremented by one and the PK1 variable is incremented by one at block 1436, because a peak was detected but it was not alternating, so a penalty is imposed on the alternation score. In the case where two peaks are detected at the same sampling time, the PA1 variable is left unchanged and the PK1 counter is incremented by 2 at block 1437 because it is unclear in what order the two peaks actually occurred. Once the PA1 variable and the PK1 variable have been updated, the PK1 variable is checked at block 1438. If the PK1 variable is less than nine, which includes peaks detected by the previous 6-peak detection process 1400 and the current 3-peak detection process 1430, the method returns to block 1433 to wait for the next peak.

If, however, the PK1 variable is greater or equal to nine, the method may optionally proceed to block 1439 before continuing to block 1440. Block 1439 is a synchronization block to ensure that the slope-synchrony calculation process shown in flowchart 1460 has completed its post-peak processing before continuing. Not all embodiments include slope-synchrony calculation, so those embodiments would skip block 1439. Some embodiments may integrate the slope-synchrony calculation method 1460 with the 3-peak detection method 1430, so those embodiments would also skip block 1439 as no synchronization is necessary.

Once it is known that the slope-synchrony calculation process 1460 has completed its post-peak processing, or there is no need for synchronizing with a slope-synchrony calculation process 1460, the PA1 variable is checked at block 1440. If that variable is less than four, no intrusion detection will be indicated at this time, so the method terminates at block 1443.

If the PA1 variable is greater than or equal to four, the method continues to block 1441 where an intrusion detection is indicated to the motion-sensor management block 1050 to take appropriate action, although in some embodiments the 3-peak detection process 1430 may directly take the intrusion response action, such as sending a message over a network, sounding an alarm, and/or turning on lights. Once the intrusion notification has been provided, in some embodiments, the 6-peak detection method of flow chart 1400 and/or the slope-synchrony calculation method of flow chart 1460 are reset and restarted at block 1442 before the 3-peak detection method is terminated at block 1443.

In some embodiments, if a timeout, which may be from Timer0 of the 6-peak detection process, or Timer1 of the 3-peak detection process, occurs, the 3-peak detection process may evaluate PK1 and PA1 to determine if an intrusion notification should be indicated. In at least one embodiment, if a timeout occurs before PK1=9, then the 3-peak detection method proceeds to block 1441 to send the intrusion notification if PK1=8 and PA1≥4, PK1=7 and PA1≥3, or PK1=6 and PA1≥3.

Note that there are several items that can be varied to tune performance of the 6-peak detection process 1400 and the 3-peak detection process 1430, including the value that PK0 is compared to in block 1411, which determines how many peaks to find in the 6-peak detection process 1400 and the value that PK1 is compared to in block 1438 of the 3-peak detection process 1430, which determines how many peaks total are to be found before evaluating for intrusion detection. Other items that can be tuned include the value that PA0 is compared to in block 1413 of the 6-peak detection process 1400 to determine whether or not to launch the 3-peak process, the value that PA1 is compared to in block 1440 to determine whether or not to indicate an intrusion detection once the total number of evaluated peaks have been detected, and the values used to determine whether or not to indicate an intrusion if a timeout occurs before the 3-peak process completes.

FIG. 14C shows a flow chart 1460 for an embodiment of a slope synchrony calculation method which starts at block 1461. Variables are initialized to zero at block 1462 and then the method waits for one of three events. A 50 ms period is waited on at block 1463, although other embodiments may use a different waiting period that is longer or shorter than 50 ms. Some embodiments may utilize the same waiting period as the sample rate of the incoming channels from the IR detector. Every 50 ms the method continues to block 1464 where the voltage changes of the channels are accumulated. In the embodiment show, four accumulators are managed. The first accumulator, VT00 accumulates the absolute values of the change in voltage of channel 0 during a peak-to-peak period of channel 0, and the second accumulator, VT01, accumulates the absolute values of the change in voltage of channel 0 during a peak-to-peak period of channel 1. The third accumulator, VT10 accumulates the absolute values of the change in voltage of channel 1 during a peak-to-peak period of channel 0, and the fourth accumulator, VT11, accumulates the absolute values of the change in voltage of channel 1 during a peak-to-peak period of channel 1. Once the accumulators have been updated, the current voltage of each channel is saved as the previous voltage of the respective channel before the method returns to block 1463 to wait for the end of another 50 ms period.

The method 1460 also waits for a peak to be detected on channel 0 at block 1465. In response to a peak on channel 0, the method proceeds to block 1466 where the accumulated voltage changes of the two channels during the peak-to-peak period of channel 0 are compared. Because the time that the changes have been accumulated over is the same for both channels, the ratio of the accumulated voltage changes is equal to the ratio of the slopes. In one embodiment, a ratio of VT10 to VT00 is calculated and compared to a predetermined slope ratio (PSR). If the ratio is between PSR and 1/PSR, the slopes of the channels are in synchrony for that time period, and the peak alternation variables, PA0, PA1, are not modified. If, however, the ratio of VT10 to VT00 is not between PSR and 1/PSR, the slopes of the channels are not in synchrony so the alternation score is modified by decrementing PA0 and PA1, which effectively cancels any effect of an alternation for that peak. Before returning to block 1465 to wait for the next peak on channel 0, the accumulators used for the channel 0 peak-to-peak accumulation, VT10 and VT00, are both reset to 0 to start accumulating for a new channel 0 peak-to-peak period. In some embodiments, a penalty count is kept instead of directly modifying the alternation score, and the penalty count is used with the alternation score to determine whether to indicate an intrusion after the desired number of peaks has been detected.

The method 1460 also waits for a peak to be detected on channel 1 at block 1467. In response to a peak on channel 1, the method proceeds to block 1468 where the accumulated voltage changes of the two channels during the peak-to-peak period of channel 1 are compared. Because the time that the changes have been accumulated over is the same for both channels, the ratio of the accumulated voltage changes is equal to the ratio of the slopes. In one embodiment, a ratio of VT11 to VT01 is calculated and compared to a predetermined slope ratio (PSR). If the ratio is between PSR and 1/PSR, the slopes of the channels are in synchrony for that time period, and the peak-alternation variables, PA0, PA1 are not modified. If, however, the ratio of VT11 to VT01 is not between PSR and 1/PSR, the slopes of the channels are not in synchrony so the alternation score is modified by decrementing PA0 and PA1, which effectively cancels any effect of an alternation for that peak. Before returning to block 1467 to wait for the next peak on channel 1, the accumulators used for the channel 1 peak-to-peak accumulation, VT11 and VT01, are both reset to 0 to start accumulating for a new channel 1 peak-to-peak period.

Various embodiments may use differing values for PSR, depending on the sensitivity of the IR detector, the signal processing performed, and various other factors. Some embodiments may use a PSR between about 1.5 and 5. In at least one embodiment, however, the PSR is about 3.

The method 1460 determines a peak-to-peak period for a first output of the plurality of outputs of the IR detector by looking for peaks on channel 0 and having separate accumulators, VT00 and VT10, of the voltage change for the two channels that are used over the channel 0 peak-to-peak period and are reset every time a new peak is detected on channel 0. The method 1460 also calculates a slope-synchrony measurement based on a first average slope of the first output over said period and a second average slope of a second output of the plurality of outputs of the IR detector over said period by calculating a ratio of VT10 to VT00 for the channel 0 peak-to-peak period. The method 1460 modifies the alternation score based, at least in part, on the slope-synchrony measurement by decrementing PA0 and/or PA1. This means that indicating an intrusion detection is based, at least in part, on both the slope-synchrony measurement and the alternation score in method 1460.

Another embodiment of the slope-synchrony method starts looking at the channels when the 6-peak method 1400 starts up and at a slope-sampling interval TSS, records the absolute value of the voltage change in channel 0 $|\Delta VCH0|$ and channel 1 $|\Delta VCH1|$ since the last slope sampling interval. As each channel's first signal peak since the method started is detected, the average of each channel's $\Delta V$ is calculated from the start of the method until peak-detection time, and a peak slope ratio is calculated as the average of $|\Delta VCH0|$ divided by the average of $|\Delta VCH1|$ and checked to see if it is between a fixed constant PSR value and its reciprocal. If it is not, then the current peak as disqualified by incrementing a Penalty Counter (PC) by one (from zero, if on the first peak, or otherwise from its current value). Then, until each channel's next new peak is detected, the embodiment continues to record $|\Delta VCH0|$ and $|\Delta VCH1|$ from that channel's previous peak-detection time until the next peak-detection time. When that channel's next new peak is detected, the average of each channel's $\Delta V$ from that channel's previous peak-detection time until the present peak-detection time is computed, and a peak-slope ratio is calculated as the average of $|\Delta VCH0|$ divided by the average of $|\Delta VCH1|$ and checked to see if it is between the fixed constant PSR value and its reciprocal. If it is not, then the current peak as disqualified by incrementing PC by one. When the PK counter reaches full count or when the detection-process timeout is reached, the PC value is subtracted from the PA-counter value, then the resulting PA value is used as in the other embodiments for determining intrusion detection or no detection.

Figure 15:
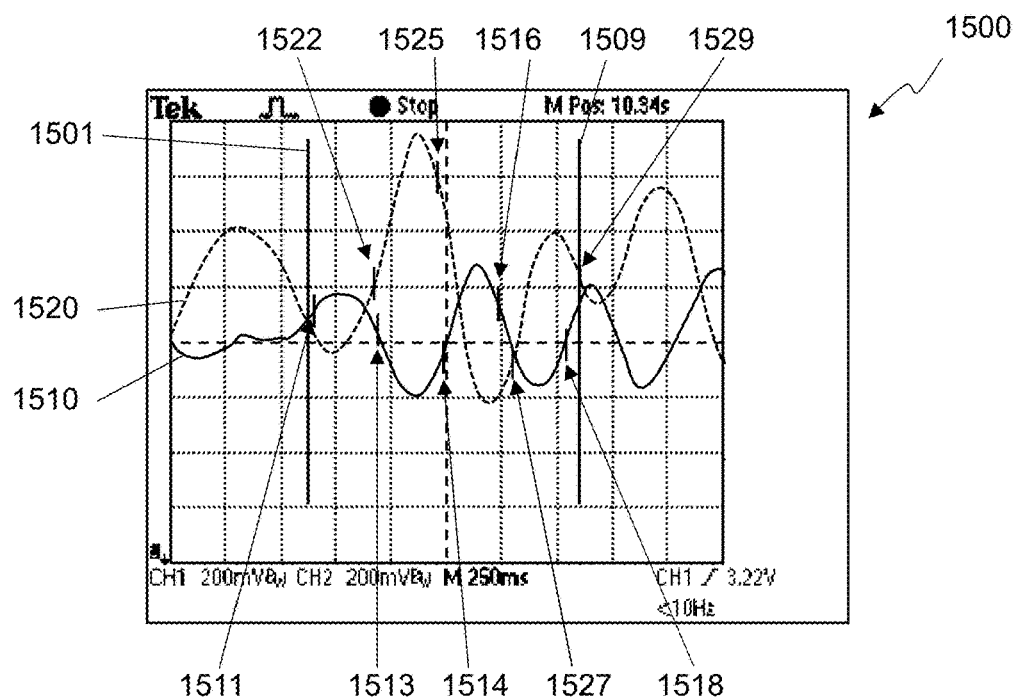
FIG. 15 is an image from an oscilloscope showing the two-channel output of an IR detector in response to a human moving through the volume of interest.
Figure 16:
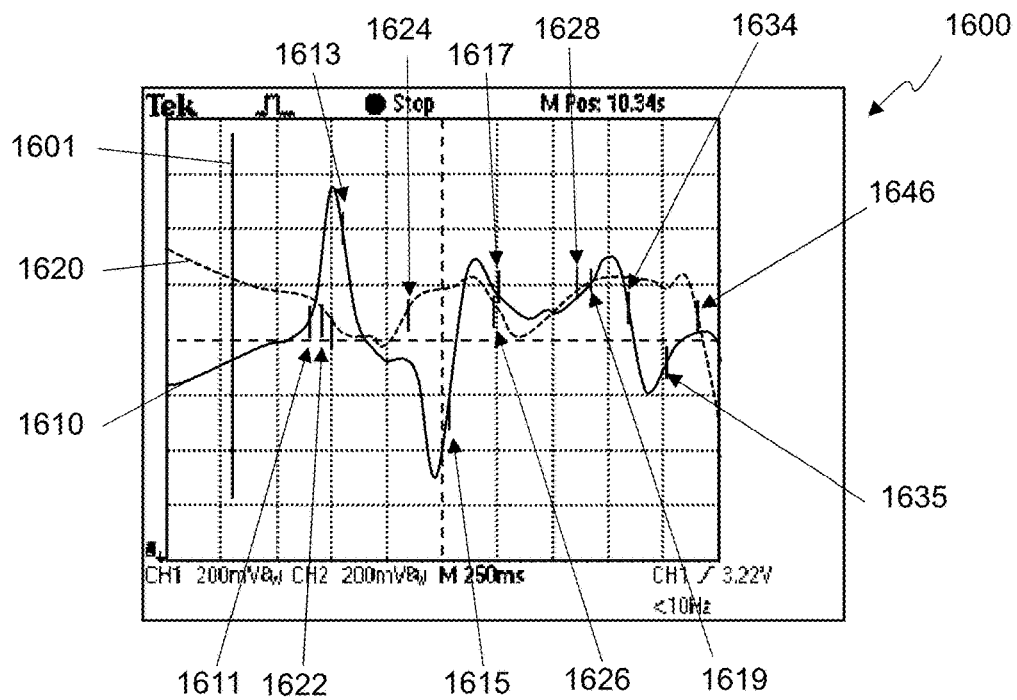
FIG. 16 is an image from an oscilloscope showing the two-channel output of an IR detector in response to a small animal moving through the volume of interest.

FIG. 15 and FIG. 16 are images from an oscilloscope showing the two-channel output of an IR detector in response to a human and an animal, respectively, moving through the volume of interest. This data was collected from experiments using a prototype motion sensor similar to those described herein. The prototype motion sensor includes an IR detector similar to the IR detector shown in FIG. 2A-D which includes a first set of detector elements 212 coupled to a first output channel of the IR detector and a second set of detector elements 216 coupled to a second output channel of the IR detector. Front-end processing is performed inside of the IR detector so that 14-bit digital samples from both channels are sent through a single physical connection out of the IR detector. The prototype motion sensor also includes the high-resolution triple-lens array shown in FIG. 1A which includes a long-range lens array 110 with a center of view angled down about 7° from the centerline of the prototype motion sensor, a mid-range lens array 120 with a center of view angled down about 23° from the centerline of the prototype motion sensor, and a short-range lens array 130 with a center of view angled down about 42° from the centerline of the prototype motion sensor. The prototype motion sensor was mounted about 8 ft (2.4 m) from the floor with its centerline tilted down about 5° from horizontal.

The long-range lens array 110 can be considered a first optical subsystem designed to direct infrared radiation from a first set of nine monitored volumes 410A onto the first set of detector elements 212. The nine monitored volumes are distributed approximately evenly horizontally through about a 90° range, which determines a first pitch of about 10°, in the horizontal direction. The first optical subsystem also is designed to direct infrared radiation from a second set of nine monitored volumes 410B, spaced at the first pitch in the horizontal direction and offset from the first set of monitored volumes 410A in the horizontal direction, onto the second set of detector elements 216. In the prototype motion sensor, the first set of monitored volumes 410A is positioned above the second set of monitored volumes 410B.

The mid-range lens array 120 can be considered a second optical subsystem designed to direct infrared radiation from a third set of seven monitored volumes 420A onto the first set of detector elements 212. The seven monitored volumes are distributed horizontally approximately evenly through about a 90° range, which determines a second pitch of about 13° in the horizontal direction. The second optical subsystem also is designed to direct infrared radiation from a fourth set of seven monitored volumes 420B, spaced at the second pitch in the horizontal direction and offset from the third set of monitored volumes 420A in the horizontal direction, onto the second set of detector elements 216. In the prototype motion sensor, the second set of monitored volumes 410B is positioned above the third set of monitored volumes 420A which is positioned above the fourth set of monitored volumes 420B.

The short-range lens array 130 can be considered a third optical subsystem designed to direct infrared radiation from a fifth set of four monitored volumes 430A onto the first set of detector elements 212. The four monitored volumes are distributed horizontally approximately evenly through about a 90° range, which determines a third pitch of about 23° in the horizontal direction. The third optical subsystem also is designed to direct infrared radiation from a sixth set of four monitored volumes 430B, spaced at the third pitch in the horizontal direction and offset from the fifth set of monitored volumes 430A in the horizontal direction, onto the second set of detector elements 216. In the prototype motion sensor, the fourth set of monitored volumes 420B is positioned above the fifth set of monitored volumes 430A which is positioned above the sixth set of monitored volumes 430B.

The prototype motion sensor includes a first system-on-chip (SoC), an EFM32ZG110F32 from Silicon Laboratories, Inc., coupled to the IR detector to receive both output channels. The first SoC includes computer code to implement the occupancy-detection processing block 1030 as shown in FIG. 11A/B and the intrusion-detection processing block 1040 as shown in FIG. 12A/B and FIG. 14A-C. The prototype motion sensor also includes a second SoC, a JN5168 from NXP, coupled to the first SoC and to the ambient light detector 909. The second SoC includes a wireless network interface and computer code to implement the motion sensor management block 1050.

FIG. 15 is an image from an oscilloscope showing the two-channel output of an IR detector in response to a human moving through the volume of interest. The first trace 1510, shown as a solid line, represents the signal from a first channel (Ch0) of the IR detector, and the second trace 1520, shown as a broken line, represents the second channel (Ch1) of the IR detector. The traces 1510, 1520 were captured at a sweep rate of 250 milliseconds (ms) per division.

As was mentioned above, the prototype motion sensor use a two-channel peak alternation method for intrusion detection to minimize false alarms caused by small warm-blooded animals, such as cats, dogs and birds. The prototype motion sensor identifies an intruder's motion by the alternating peaks of the IR detector's two signals from its spatially-offset fields of view. When a human walks through the fields of view, two phase-offset signals are produced with alternating peaks, as shown by Ch0 1510 and Ch1 1520 in the image 1500.

Table 1 below shows some of the events from the Ch0 1510 and Ch1 1520 and shows how the method shown in FIG. 14A-C processes those events. The first column is simply a row number and the "Event" column identifies an event on the image 1500, such as a peak in one of the channels. The "Alt?" column indicates whether the peak was an alternate peak as compared to the previous peak. The "P2P Period" column identifies the period of time used by the slope-synchrony process 1460 to use to determine if the slopes of the two channels are in synchrony. The "Slope Sync?" column indicates whether the slope-synchrony process 1460 determined that the slopes were in synchrony and whether or not the alternation score is adjusted. The "PK0", "PA0", "PK1", and "PA1" columns provide the value of the respective variables in the 6-peak process 1400 and 3-peak process 1430 after they have been adjusted for the peak included in that row, and the "Int?" column indicates whether an intrusion detection notification is sent.

Table 1 starts at row 1 with Restart 1501 which came after a restart of the 6-peak process 1400 which can be either block 1401 or block 1402. The slope-synchrony process 1460 is also restarted at restart 1501. The next event is peak 1511 on Ch0, shown on row 2, which is evaluated by the slope-synchrony process 1460 over the peak-to-peak period of Ch0 1501-1511, and it is determined that the slopes of the two channels were in synchrony during that period, so no adjustment of the alternation score is necessary. PK0 and PA0 are unchanged by the 6-peak process as it is still waiting for the second peak at block 1403.

Row 3 of Table 1 shows that a peak 1522 was detected on Ch1, which is an alternate peak and is the 2nd peak seen by the 6-peak process 1400 which then sets PK0 to 2 and increments PA0 by 1. The slope-synchrony process 1460 evaluates the change in voltage of the two channels over the period from peak 1501 to peak 1522 and determines that the two channels are in synchrony so no adjustment to the alternation score is necessary. Because this particular set of traces stays in synchrony for the entire period, the slope-synchrony process 1460 will not be discussed further for these traces 1510, 1520.

Row 4 of Table 1 shows that alternating peak 1513 on Ch0 was recognized and both the PK0 and PA0 variables incremented. Row 5 of Table 1 shows that peak 1514 was recognized on Ch0, which is not an alternating peak because the previous peak was also on Ch0. In response to recognizing a non-alternating peak, PK0 is incremented to 4, but PA0 is decremented back down to 1.

TABLE 1

| | Event | Alt? | P2P Period | Slope Sync? | PK0 | PA0 | PK1 | PA1 | Int? |
|---|---|---|---|---|---|---|---|---|---|
| 1 | 1501 Restart | — | — | — | 0 | 0 | — | — | No |
| 2 | 1511 Ch0 Peak | — | 1501-1511 | Sync No PA Adj. | 0 | 0 | — | — | No |

TABLE 1-continued

| | Event | Alt? | P2P Period | Slope Sync? | PK0 | PA0 | PK1 | PA1 | Int? |
|---|---|---|---|---|---|---|---|---|---|
| 3 | 1522 Ch1 Peak | Yes | 1501-1522 | Sync No PA Adj. | 2 | 1 | — | — | No |
| 4 | 1513 Ch0 Peak | Yes | 1511-1513 | Sync No PA Adj. | 3 | 2 | — | — | No |
| 5 | 1514 Ch0 Peak | No | 1513-1514 | Sync No PA Adj. | 4 | 1 | — | — | No |
| 6 | 1525 Ch1 Peak | Yes | 1522-1525 | Sync No PA Adj. | 5 | 2 | — | — | No |
| 7 | 1516 Ch0 Peak | Yes | 1514-1516 | Sync No PA Adj. | 6/0 | 3/0 | 6 | 3 | No |
| 8 | 1527 Ch1 Peak | Yes | 1525-1527 | Sync No PA Adj. | 0 | 0 | 7 | 4 | No |
| 9 | 1518 Ch0 Peak | Yes | 1516-1518 | Sync No PA Adj. | 2 | 1 | 8 | 5 | No |
| 10 | 1529 Ch1 Peak | Yes | 1527-1529 | Sync No PA Adj. | 3 | 2 | 9 | 6 | Yes |
| 11 | 1509 Restart | — | — | — | 0 | 0 | — | — | No |

Row 6 and row 7 of Table 1 both show detection of alternating peaks 1525, 1516 which both cause the PK0 and PA0 variables to be incremented. PK0 is set to 6 at block 1408 and checked at block 1411 in the 6-peak process 1400, so the value of PA0 is checked at block 1413 where the value of PA0, which was set to 3 at block 1408, is found to be greater than 0. Therefore, the 3-peak process 1430 is launched with PK1 set to 6 and PA1 set to 3, the values of PK0 and PA0 respectively, at block 1414 before PK0 and PA0 are reset to 0 at block 1402 and the 6-peak process 1400 restarts.

Row 8 of Table 1 shows the detection of peak 1527 on Ch0, which is an alternate peak, causing the 3-peak process 1430 to increment both PK1 and PA1 while the 6-peak process 1400 continues to wait for the second peak. Peak 1518 is shown in row 9 of Table 1 causing the 6-peak process 1400 to set PK0 to 2 and PA0 to 1 while the 3-peak process 1430 increments PK1 to 8 and PA1 to 5.

Row 10 of Table 1 shows that peak 1529 on Ch1 was detected causing the 6-peak process 1400 to increment PK0 to 3 and PA0 to 2 while the 3-peak process 1430 increments PK1 to 9 and PA1 to 6. The 3-peak process 1430 detects that PK1 is 9 at block 1438 and checks PA1 at block 1440, which is greater than 4, causing an intrusion detection to be sent at block 1441 of the 3-peak process 1430 before the 6-peak process 1400 and the slope-synchrony process 1460 are restarted and the 3-peak process ended at block 1443, as shown in line 11 of Table 1. Note that while the two channels stayed in synchrony during the traces 1510, 1520 shown in the image 1500, even if the slope-synchrony process 1460 had determined that during some of the peak-to-peak periods the two channels' slopes were out of synchrony, the intrusion detection would have still occurred as long as it only happened during one or two peak-to-peak periods.

FIG. 16 is an image from an oscilloscope showing the two-channel output of an IR detector in response to a small animal moving through the volume of interest. The first trace 1610, shown as a solid line, represents the signal from a first channel (Ch0) of the IR detector, and the second trace 1620, shown as a broken line, represents the second channel (Ch1) of the IR detector. The traces 1610, 1620 were captured at a sweep rate of 250 milliseconds (ms) per division.

As was mentioned above, the prototype motion sensor uses a two-channel peak alternation method for intrusion detection to minimize false alarms caused by small warm-blooded animals, such as cats, dogs, and birds. The prototype motion sensor differentiates small animal motion from an intruders' motion by detecting that consecutive peaks are on the same channel, not alternating as the channels do for human detection. But some movements by animals through the monitored space create complex waveforms that can be interpreted as having alternate peaks as is shown in the image 1600.

Table 2 below shows some of the events from the Ch0 1610 and Ch1 1620 and shows how the method shown in FIG. 14A-C processes those events. The first column is simply a row number, and the "Event" column identifies an event on the image 1600, such as a peak in one of the channels. The "Alt?" column indicates whether the peak was an alternate peak as compared to the previous peak. The "P2P Period" column identifies the period of time used by the slope-synchrony process 1460 to use to determine if the slopes of the two channels are in synchrony. The "Slope Sync?" column indicates whether the slope-synchrony process 1460 determines that the slopes were in synchrony and whether or not the alternation score is adjusted. The "PK0", "PA0", "PK1", and "PA1" columns provide the value of the respective variables in the 6-peak process 1400 and 3-peak process 1430 after they have been adjusted for that peak, and the "Int?" column indicates whether an intrusion detection notification is sent.

Table 2 starts at row 1 with Timeout 1601 which causes a restart of the 6-peak process 1400 at block 1402. The slope-synchrony process 1460 is also restarted at timeout 1601. The next event is peak 1611 on Ch0, shown on row 2, which is evaluated by the slope-synchrony process 1460 over the peak-to-peak period of Ch0 1601-1611, and it is determined that the slopes of the two channels were in synchrony during that period, so no adjustment of the alternation score is necessary. PK0 and PA0 are unchanged by the 6-peak process as it is still waiting for the second peak at block 1403.

TABLE 2

| | Event | Alt? | P2P Period | Slope Sync? | PK0 | PA0 | PK1 | PA1 | Int? |
|---|---|---|---|---|---|---|---|---|---|
| 1 | 1601 Timeout | — | — | — | 0 | 0 | — | — | No |
| 2 | 1611 Ch0 Peak | — | 1601-1611 | Sync No PA Adj. | 0 | 0 (1$^{st}$ Pk) | — | — | No |
| 3 | 1622 Ch1 Peak | Yes | 1601-1622 | Sync No PA Adj. | 2 | 1 | — | — | No |
| 4 | 1613 Ch0 Peak | Yes | 1611-1613 | No Sync Adj. PA | 3 | +1 − 1 = 1 | — | — | No |
| 5 | 1624 Ch1 Peak | Yes | 1622-1624 | No Sync Adj. PA | 4 | +1 − 1 = 1 | — | — | No |
| 6 | 1615 Ch0 Peak | Yes | 1613-1615 | No Sync Adj. PA | 5 | +1 − 1 = 1 | — | — | No |
| 7 | 1626 Ch1 Peak | Yes | 1624-1626 | No Sync Adj. PA | 6/0 | +1 − 1 = 1/0 | 6 | 1 | No |

TABLE 2-continued

| Event | Alt? | P2P Period | Slope Sync? | PK0 | PA0 | PK1 | PA1 | Int? |
|---|---|---|---|---|---|---|---|---|
| 8  1617 Ch0 Peak | Yes | 1615-1617 | No Sync Adj. PA | 0 | −1 ($1^{st}$ Pk) | 7 | +1 − 1 = 1 | No |
| 9  1628 Ch1 Peak | Yes | 1626-1628 | Sync No PA Adj. | 2 | 0 | 8 | 2 | No |
| 10  1619 Ch0 Peak | Yes | 1617-1619 | Sync No PA Adj. | 3 | 1 | 9 | 3 | No |
| 11  1634 Ch0 Peak | No | 1619-1634 | No Sync Adj. PA | 4 | −1 | — | — | No |
| 12  1635 Ch0 Peak | No | 1634-1635 | No Sync Adj. PA | 5 | −3 | — | — | No |
| 13  1646 Ch1 Peak | Yes | 1628-1646 | No Sync Adj. PA | 6/0 | +1 − 1 = −3/0 | — | — | No |

Row 3 of Table 2 shows that a peak 1622 was detected on Ch1, which is an alternate peak and is the 2nd peak seen by the 6-peak process 1400 which then sets PK0 to 2 and increments PA0 by 1. The slope-synchrony process 1460 evaluates the change in voltage of the two channels over the period from peak 1601 to 1622 and determines that the two channels are in synchrony so no adjustment to the alternation score is necessary. Row 4 of Table 2 shows that alternating peak 1613 on Ch0 was recognized and both the PK0 and PA0 variables are incremented at block 1408 of the 6-peak process 1400. But the slope-synchrony process 1430 determines that the two channels' slopes were not in synchrony during the 1611-1633 peak-to-peak period of Ch0, so PA0 is decremented at block 1465 of the slope-synchrony process 1460, leaving PA0 at 1.

Rows 5, 6 and 7 of Table 2 all show detection of alternating peaks 1624, 1615, 1626 without slope synchrony, which causes the PK0 variable to be incremented each time, but also causes the PA0 variable to be incremented by the 6-peak process 1400 and decremented by the slope-synchrony process 1460 for each peak 1624, 1615, 1626, leaving PA0 at 1. PK0 is set to 6 at block 1408 in the 6-peak process 1400, so block 1411 detects that, and the 6-peak process 1400 then evaluates PA0 at block 1413. Because the value of PA0 is 1, which is greater than 0, the 3-peak process 1430 is launched with PK1 set to 6 and PA1 set to 1, the values of PK0 and PA0 respectively, at block 1414 before PK0 and PA0 are reset to 0 at block 1402 and the 6-peak process 1400 restarts.

Row 8 of Table 2 shows the detection of peak 1617 on Ch0, which is an alternate peak, causing the 3-peak process 1430 to increment both PK1 and PA1 while the 6-peak process 1400 continues to wait for the second peak at block 1403, so the 6-peak process 1400 does not change PK0 or PA0. The slopes of the channels are determined to not be in sync during the 1615-1617 peak-to-peak period of Ch0, so PA1 and PA0 are decremented by the slope-synchrony process 1430. Peak 1628 is shown in row 9 of Table 2 causing the 6-peak process to set PK0 to 2 and increment PA0 to 0 while the 3-peak process 1430 increments PK1 to 8 and PA1 to 2. The two channels are determined to be in synchrony, so there is no adjustment of PA0 or PA1 by the slope-synchrony process 1460.

Row 10 of Table 2 shows that peak 1619 was detected on Ch0. Because peak 1619 is an alternate peak and the two channels' slopes were in synchrony, PK0, PA0, PK1, and PA1 are all incremented. PK1 is determined to be equal to 9 at block 1438 of the 3-peak process 1430, causing PA1 to be evaluated at block 1440. Because PA1 is less than 4, no intrusion detection is indicated, and the 3-peak process 1430 ends at block 1443.

Row 11 and 12 of Table 2 show peak 1634 and peak 1635 on Ch0 which are both non-alternating peaks, and the two channels' slopes are determined to not be in synchrony for both peak-to-peak periods, causing PA0 to be decremented twice for each peak, once at block 1409 of the 6-peak process 1400 and once at block 1436 of the slope-synchrony process 1460. Peak 1646 on Ch1 in row 13 of Table 2 is an alternating peak, but the two channels are not in synchrony, so PA0 is incremented and decremented, leaving PA0 at −3. PK0 is set to 6 so PA0 is evaluated to determine whether or not to launch a 3-peak process. PA0 is −3, which is less than 0, so the 3-peak process is not launched and PK0 and PA0 are reset back to 0 and the 6-peak process 1400 restarts.

Other test cases were also created for an animal moving through the volume of interest where one channel had peaks while the other channel had no peaks or where the first channel had several peaks followed by the other channel having several peaks. A person having ordinary skill in the art can easily follow the flow charts 1400, 1430, 1460 to see that no intrusion detection would be generated in those cases, avoiding a false intrusion notification. Testing of the prototype motion sensor has shown a very low false alarm rate while at the same time showing a good sensitivity to intrusion by a human. The prototype motion sensor has also shown a high sensitivity to motion for generating occupancy detection notifications when used for that purpose. Thus, motion sensors built as described herein can function as both an effective occupancy detector as well as a sensitive intrusion detector with a low false-alarm rate.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

As will be appreciated by those of ordinary skill in the art, aspects of the various embodiments may be embodied as a system, device, method, or computer program product apparatus. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer readable medium(s) having computer program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described below:

Embodiment 1

A method of detecting motion using an infrared detector with a plurality of outputs, the method comprising:

selecting a set of peaks in the plurality of outputs of the infrared detector;

calculating an alternation score based on a number of alternating peaks in the set of peaks; and indicating motion detection based, at least in part, on the alternation score.

Embodiment 2

The method of embodiment 1, wherein the indicating comprises sounding an audible intrusion alarm or turning on one or more lights.

Embodiment 3

The method of any of embodiments 1-2, wherein the indicating comprises sending a message over a network, contents of the message dependent upon settings in a motion sensor that includes the infrared detector, the contents including an occupancy status, an animal-immune intrusion indication, or a non-animal-immune motion detection indication.

Embodiment 4

The method of any of embodiments 1-3, further comprising band-pass filtering the plurality of outputs of the infrared detector before said selecting.

Embodiment 5

The method of embodiment 4, wherein the band-pass filtering has a band-pass range of about 0.25 Hz to about 4 Hz.

Embodiment 6

The method of embodiment 4, further comprising compensating the plurality of outputs of the infrared detector for a frequency response of the infrared detector before said selecting.

Embodiment 7

The method of embodiment 6, wherein the band-pass filtering has a band-pass range of about 0.06 Hz to about 5.6 Hz.

Embodiment 8

The method of any of embodiments 1-7, the set of peaks consisting of a predetermined number of consecutive peaks in the plurality of outputs of the infrared detector.

Embodiment 9

The method of any of embodiments 1-8, further comprising:
determining a peak-to-peak period for a first output of the plurality of outputs of the infrared detector;
calculating a slope-synchrony measurement based on a first average slope of the first output over said period and a second average slope of a second output of the plurality of outputs of the infrared detector over said period; and
modifying the alternation score based, at least in part, on the slope-synchrony measurement.

Embodiment 10

A method of detecting motion using an infrared detector with a plurality of outputs, the method comprising:
determining a peak-to-peak period for a first output of the plurality of outputs of the infrared detector;
calculating a slope-synchrony measurement based on a first average slope of the first output over said period and a second average slope of a second output of the plurality of outputs of the infrared detector over said period; and
indicating motion detection based, at least in part, on the slope-synchrony measurement.

Embodiment 11

The method of embodiment 10, wherein the indicating comprises sounding an audible intrusion alarm or turning on one or more lights.

Embodiment 12

The method of any of embodiments 10-11, wherein the indicating comprises sending a message over a network, contents of the message dependent upon settings in a motion sensor that includes the infrared detector, the contents including an occupancy status, an animal-immune intrusion indication, or a non-animal-immune motion detection indication.

Embodiment 13

The method of any of embodiments 10-12, further comprising band-pass filtering the plurality of outputs of the infrared detector before said determining.

Embodiment 14

The method of embodiment 13, wherein the band-pass filtering has a band-pass range of about 0.25 Hz to about 4 Hz.

Embodiment 15

The method of embodiment 13, further comprising compensating the plurality of outputs of the infrared detector for a frequency response of the infrared detector before said determining.

Embodiment 16

The method of embodiment 15, wherein the band-pass filtering has a band-pass range of about 0.06 Hz to about 5.6 Hz.

Embodiment 17

The method of any of embodiments 10-16, wherein the calculating of the slope-synchrony measurement comprises:
accumulating absolute values of discrete changes in voltage of the first output from a first peak in the first output to a second peak in the first output;
accumulating an absolute value of discrete changes in voltage of the second output from the first peak in the first output to the second peak in the first output; and
calculating a ratio between the accumulated changes in the first output and the accumulated changes in the second output as the slope-synchrony measurement.

Embodiment 18

The method of any of embodiments 10-17, further comprising:
selecting a set of peaks in the plurality of outputs of the infrared detector;
calculating an alternation score based on a number of alternating peaks in the set of peaks; and
indicating the motion detection based, at least in part, on the alternation score.

Embodiment 19

A method of detecting motion comprising:
receiving a first output of an infrared detector representing a warm body passing through a first set of monitored volumes;
receiving a second output of the infrared detector representing the warm body passing through a second set of monitored volumes, wherein the second set of monitored volumes have a horizontal offset from the first set of monitored volumes;
detecting first peaks of the first output and second peaks of the second output;
determining an evaluation period;
creating an alternation score based on a relative phase relationship of the first peaks to the second peaks during the evaluation period;
generating an animal-immune motion indication based on the alternation score.

Embodiment 20

The method of embodiment 19, the first set of monitored volumes comprising a first row of monitored volumes of a first tier of monitored volumes and the second set of monitored volumes comprising a second row of monitored volumes of the first tier of monitored volumes, the second row of monitored volumes of the first tier of monitored volumes horizontally offset from, and non-overlapping with, the first row of monitored volumes of the first tier of monitored volumes.

Embodiment 21

The method of embodiment 20, the first set of monitored volumes comprising a first row of monitored volumes of a second tier of monitored volumes and the second set of monitored volumes comprising a second row of monitored volumes of the second tier of monitored volumes, the first row of monitored volumes of the second tier of monitored volumes horizontally offset from, and non-overlapping with, the second row of monitored volumes of the second tier of monitored volumes;

the first tier of monitored volumes created by a first optical subsystem with a first focal length and consisting of a first number of monitored volumes;

the second tier of monitored volumes created by a second optical subsystem with a second focal length and consisting of a second number of monitored volumes;

wherein the first focal length is different than the second focal length, and the first number is different than the second number.

Embodiment 22

The method of any of embodiments 19-21, further comprising band-pass filtering the first output of the infrared detector and the second output of the infrared detector before said detecting.

Embodiment 23

The method of any of embodiments 22-22, further comprising compensating the first output of the infrared detector and the second output of the infrared detector for a frequency response of the infrared detector before said detecting.

Embodiment 24

The method of any of embodiments 19-23, further comprising:
determining interpeak periods of the first output;
calculating, for the interpeak periods of the first output occurring during the evaluation period, ratios of first values to second values, the first values based on a slope of the first output and the second values based on a slope of the second output; and
adjusting the alternation score based on the ratios.

Embodiment 25

The method of any of embodiments 19-24, wherein the evaluation period is determined based on a number of combined first peaks and second peaks.

Embodiment 26

A method of detecting motion comprising:
receiving a first output of an infrared detector representing a warm body passing through a first set of monitored volumes;
receiving a second output of the infrared detector representing the warm body passing through a second set of monitored volumes, wherein the second set of monitored volumes have a horizontal offset from the first set of monitored volumes;
detecting peaks of the first output;
determining interpeak periods of the first output;
determining an evaluation period;
calculating, for the interpeak periods of the first output occurring during the evaluation period, ratios of first values to second values, the first values based on a slope of the first output and the second values based on a slope of the second output;

generating an animal-immune motion indication based on the ratios.

Embodiment 27

The method of embodiment 26, further comprising band-pass filtering the first output of the infrared detector and the second output of the infrared detector before said detecting.

Embodiment 28

The method of any of embodiments 26-27, further comprising compensating the first output of the infrared detector and the second output of the infrared detector for a frequency response of the infrared detector before said detecting.

Embodiment 29

The method of any of embodiments 26-28, the first set of monitored volumes comprising a first row of monitored volumes of a first tier of monitored volumes and the second set of monitored volumes comprising a second row of monitored volumes of the first tier of monitored volumes, the second row of monitored volumes of the first tier of monitored volumes horizontally offset from, and non-overlapping with, the first row of monitored volumes of the first tier of monitored volumes.

Embodiment 30

The method of embodiment 29, the first set of monitored volumes comprising a first row of monitored volumes of a second tier of monitored volumes and the second set of monitored volumes comprising a second row of monitored volumes of the second tier of monitored volumes, the first row of monitored volumes of the second tier of monitored volumes horizontally offset from, and non-overlapping with, the second row of monitored volumes of the second tier of monitored volumes;

the first tier of monitored volumes created by a first optical subsystem with a first focal length and consisting of a first number of monitored volumes;

the second tier of monitored volumes created by a second optical subsystem with a second focal length and consisting of a second number of monitored volumes;

wherein the first focal length is different than the second focal length, and the first number is different than the second number.

Embodiment 31

A method of detecting motion comprising:
receiving a first output of an infrared detector representing a warm body passing through a first set of monitored volumes;
receiving a second output of the infrared detector representing the warm body passing through a second set of monitored volumes, wherein the second set of monitored volumes have a horizontal offset from the first set of monitored volumes;
detecting first peaks of the first output and second peaks of the second output;

during a period where N combined first peaks and second peaks are detected, creating an alternation score based on a relative phase relationship of the first peaks to the second peaks;

generating an animal-immune motion indication based on the alternation score.

Embodiment 32

The method of embodiment 31, further comprising band-pass filtering the first output of the infrared detector and the second output of the infrared detector before said detecting.

Embodiment 33

The method of any of embodiments 31-32, further comprising compensating the first output of the infrared detector and the second output of the infrared detector for a frequency response of the infrared detector before said detecting.

Embodiment 34

The method of any of embodiments 31-33, the first set of monitored volumes comprising a first row of monitored volumes of a first tier of monitored volumes and the second set of monitored volumes comprising a second row of monitored volumes of the first tier of monitored volumes, the second row of monitored volumes of the first tier of monitored volumes horizontally offset from, and non-overlapping with, the first row of monitored volumes of the first tier of monitored volumes.

Embodiment 35

The method of embodiment 34, the first set of monitored volumes comprising a first row of monitored volumes of a second tier of monitored volumes and the second set of monitored volumes comprising a second row of monitored volumes of the second tier of monitored volumes, the first row of monitored volumes of the second tier of monitored volumes horizontally offset from, and non-overlapping with, the second row of monitored volumes of the second tier of monitored volumes;

the first tier of monitored volumes created by a first optical subsystem with a first focal length and consisting of a first number of monitored volumes;

the second tier of monitored volumes created by a second optical subsystem with a second focal length and consisting of a second number of monitored volumes;

wherein the first focal length is different than the second focal length, and the first number is different than the second number.

Embodiment 36

At least one machine readable medium comprising one or more instructions that in response to being executed on a computing device cause the computing device to carry out a method according to any one of embodiments 1 through 35.

Embodiment 37

A motion sensor comprising:

an infrared detector comprising a first set of detector elements and a second set of detector elements;

a first optical subsystem adapted to direct infrared radiation from a first row of monitored volumes spaced at a first pitch in a first direction onto the first set of detector elements, and to direct infrared radiation from a second row of monitored volumes spaced at the first pitch in the first direction, and offset from the first row of monitored volumes in the first direction, onto the second set of detector elements, the first row and the second row each consisting of a first number of monitored volumes; and a second optical subsystem adapted to direct infrared radiation from a third row of monitored volumes spaced at a second pitch in the first direction onto the first set of detector elements, and to direct infrared radiation from a fourth row of monitored volumes spaced at the second pitch in the first direction, and offset from the third row of monitored volumes in the first direction, onto the second set of detector elements, the third row and the fourth row each consisting of a second number of monitored volumes, the second number being different than the first number.

Embodiment 38

The motion sensor of embodiment 37, wherein the only common factor between the first number and the second number is 2.

Embodiment 39

The motion sensor of any of embodiments 37-38, the first optical system having a first focal length and the second optical system having a second focal length, the second focal length different than the first focal length.

Embodiment 40

The motion sensor of embodiment 39, wherein a ratio of the first focal length to the second focal length is about equal to a square-root of 2.

Embodiment 41

The motion sensor of any of embodiments 39-40, wherein, with the motion sensor in an upright position, the first row of monitored volumes is positioned above the second row of monitored volumes, the second row of monitored volumes is positioned above the third row of monitored volumes, and the third row of monitored volumes is positioned above the fourth row of monitored volumes;

the first focal length is longer than the second focal length; and the first number of monitored volumes is greater than the second number of monitored volumes.

Embodiment 42

The motion sensor of any of embodiments 39-41, further comprising:

a third optical subsystem having a third focal length, different from the first focal length and the second focal length, and adapted to direct infrared radiation from a fifth row of monitored volumes spaced at a third pitch in the first direction onto the first set of detector elements, and to direct infrared radiation from a sixth row of monitored volumes spaced at the third pitch in the first direction, and offset from the fifth row of monitored volumes in the first direction, onto the second set of detector elements, the fifth row and the sixth row each consisting of a third number of monitored volumes, the third number being different than the first number and the second number;

wherein the only common factor between any two of the first number, the second number, and the third number is 2.

Embodiment 43

The motion sensor of any of embodiments 37-42, wherein the second set of detector elements are positioned with a first detector offset from the first set of detector elements in a first detector direction on a pyroelectric substrate; and the second set of detector elements are positioned at a second detector offset from the first set of detector elements in a second detector direction on the pyroelectric substrate that is orthogonal to the first detector direction.

Embodiment 44

The motion sensor of any of embodiments 37-42, wherein the second set of detector elements are positioned without a significant offset from the first set of detector elements in a first detector direction on a pyroelectric substrate, and the second set of detector elements are positioned at an offset from the first set of detector elements in a second detector direction on the pyroelectric substrate that is orthogonal to the first detector direction; and wherein the first optical system comprises:

a first set of optical elements to direct the infrared radiation from the first row of monitored volumes onto the first set of detector elements via a first optical path having a first geometry; and a second set of optical elements to direct the infrared radiation from the second row of monitored volumes onto the second set of detector elements via a second optical path having a second geometry that is different than the first geometry.

Embodiment 45

The motion sensor of any of embodiments 37-44, further comprising:

intrusion detection circuitry, coupled to the first set of detector elements via a first channel and coupled to the second set of detector elements via a second channel, the intrusion detection circuitry adapted to indicate an intrusion detection.

Embodiment 46

The motion sensor of any of embodiments 45, further comprising:

a first band-pass filter with a first filter input coupled to a first output of the first set of detector elements and a first filter output coupled to the first channel; and a second band-pass filter with a second filter input coupled to a second output of the second set of detector elements and a second filter output coupled to the second channel.

Embodiment 47

The motion sensor of any of embodiments 45-46, further comprising:

a first frequency compensation filter with a first compensation input coupled to a first output of the first set of detector elements and a first compensation output coupled to the first channel; and a second frequency compensation filter with a second compensation input coupled a second output of the second set of detector elements and a second compensation output coupled to the second channel.

Embodiment 48

The motion sensor of any of embodiments 45-47, the intrusion detection circuitry further adapted to:

select a set of peaks in a first signal received via the first channel and in a second signal received via the second channel;

calculate an alternation score based on a number of alternating peaks in the set of peaks; and indicate the intrusion detection based, at least in part, on the alternation score.

Embodiment 49

The motion sensor of any of embodiments 45-48, the intrusion detection circuitry further adapted to:

determine a peak-to-peak period for a first signal received via the first channel;

calculate a slope-synchrony measurement based on a first average slope of the first signal over said period and a second average slope of a second signal received via the second channel over said period; and indicate the intrusion detection based, at least in part, on the slope-synchrony measurement.

Embodiment 50

The motion sensor of any of embodiments 45-19, the intrusion detection circuitry further adapted to indicate the intrusion detection by sounding an audible intrusion alarm or turning on one or more lights.

Embodiment 51

The motion sensor of any of embodiments 45-50, the intrusion detection circuitry further adapted to indicate the intrusion detection by sending a message over a network, contents of the message dependent upon settings in the motion sensor, the contents including an occupancy status, an animal-immune intrusion indication, or a non-animal-immune motion detection indication.

As used in this specification and the appended claims, the singular forms "a", "an", and "the" include plural referents unless the content clearly dictates otherwise. Thus, for example, reference to an element described as "a monitored volume" may refer to a single monitored volume, two monitored volumes, or any other number of monitored volumes. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.33, and 5). Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A motion sensor comprising:
    an infrared detector comprising a first set of detector elements and a second set of detector elements;
    a first optical subsystem adapted to direct infrared radiation from a first row of monitored volumes spaced at a first pitch in a first direction onto the first set of detector elements, and to direct infrared radiation from a second row of monitored volumes spaced at the first pitch in the first direction, and offset from the first row of monitored volumes in the first direction, onto the second set of detector elements, the first row and the second row each consisting of a first number of monitored volumes; and
    a second optical subsystem adapted to direct infrared radiation from a third row of monitored volumes spaced at a second pitch in the first direction onto the first set of detector elements, and to direct infrared radiation from a fourth row of monitored volumes spaced at the second pitch in the first direction, and offset from the third row of monitored volumes in the first direction, onto the second set of detector elements, the third row and the fourth row each consisting of a second number of monitored volumes, the second number being different than the first number.

2. The motion sensor of claim 1, wherein the only common factor between the first number and the second number is 2.

3. The motion sensor of claim 1, the first optical system having a first focal length and the second optical system having a second focal length, the second focal length different than the first focal length.

4. The motion sensor of claim 3, wherein a ratio of the first focal length to the second focal length is about equal to a square-root of 2.

5. The motion sensor of claim 3, wherein, with the motion sensor in an upright position, the first row of monitored volumes is positioned above the second row of monitored volumes, the second row of monitored volumes is positioned above the third row of monitored volumes, and the third row of monitored volumes is positioned above the fourth row of monitored volumes;
    the first focal length is longer than the second focal length; and
    the first number of monitored volumes is greater than the second number of monitored volumes.

6. The motion sensor of claim 3, further comprising:
    a third optical subsystem having a third focal length, different from the first focal length and the second focal length, and adapted to direct infrared radiation from a fifth row of monitored volumes spaced at a third pitch in the first direction onto the first set of detector elements, and to direct infrared radiation from a sixth row of monitored volumes spaced at the third pitch in the first direction, and offset from the fifth row of monitored volumes in the first direction, onto the second set of detector elements, the fifth row and the sixth row each consisting of a third number of monitored volumes, the third number being different than the first number and the second number;
    wherein the only common factor between any two of the first number, the second number, and the third number is 2.

7. The motion sensor of claim 1, wherein the second set of detector elements are positioned with a first detector offset from the first set of detector elements in a first detector direction on a pyroelectric substrate; and
    the second set of detector elements are positioned at a second detector offset from the first set of detector elements in a second detector direction on the pyroelectric substrate that is orthogonal to the first detector direction.

8. The motion sensor of claim 1, wherein the second set of detector elements are positioned without a significant offset from the first set of detector elements in a first detector direction on a pyroelectric substrate, and the second set of detector elements are positioned at an offset from the first set of detector elements in a second detector direction on the pyroelectric substrate that is orthogonal to the first detector direction; and
    wherein the first optical system comprises:
    a first set of optical elements to direct the infrared radiation from the first row of monitored volumes onto the first set of detector elements via a first optical path having a first geometry; and
    a second set of optical elements to direct the infrared radiation from the second row of monitored volumes onto the second set of detector elements via a second optical path having a second geometry that is different than the first geometry.

9. The motion sensor of claim 1, further comprising:
    intrusion detection circuitry, coupled to the first set of detector elements via a first channel and coupled to the second set of detector elements via a second channel, the intrusion detection circuitry adapted to indicate an intrusion detection.

10. The motion sensor of claim 9, further comprising:
    a first band-pass filter with a first filter input coupled to a first output of the first set of detector elements and a first filter output coupled to the first channel; and
    a second band-pass filter with a second filter input coupled to a second output of the second set of detector elements and a second filter output coupled to the second channel.

11. The motion sensor of claim 9, further comprising:
    a first frequency compensation filter with a first compensation input coupled to a first output of the first set of detector elements and a first compensation output coupled to the first channel; and
    a second frequency compensation filter with a second compensation input coupled a second output of the second set of detector elements and a second compensation output coupled to the second channel.

12. The motion sensor of claim 9, the intrusion detection circuitry further adapted to:
    select a set of peaks in a first signal received via the first channel and in a second signal received via the second channel;

calculate an alternation score based on a number of alternating peaks in the set of peaks; and indicate the intrusion detection based, at least in part, on the alternation score.

13. The motion sensor of claim 9, the intrusion detection circuitry further adapted to:

determine a peak-to-peak period for a first signal received via the first channel;

calculate a slope-synchrony measurement based on a first average slope of the first signal over said period and a second average slope of a second signal received via the second channel over said period; and indicate the intrusion detection based, at least in part, on the slope-synchrony measurement.

14. The motion sensor of claim 9, the intrusion detection circuitry further adapted to indicate the intrusion detection by sounding an audible intrusion alarm and/or turning on one or more lights.

15. The motion sensor of claim 9, the intrusion detection circuitry further adapted to indicate the intrusion detection by sending a message over a network, contents of the message dependent upon settings in the motion sensor, the contents including an occupancy status, an animal-immune intrusion indication, and/or a non-animal-immune motion detection indication.

16. A method of detecting motion comprising:

receiving infrared radiation from a first row of monitored volumes spaced at a first pitch in a first direction, the first row of monitored volumes consisting of a first number of monitored volumes;

receiving infrared radiation from a second row of monitored volumes spaced at the first pitch in the first direction, and offset from the first row of monitored volumes in the first direction, the second row of monitored volumes consisting of the first number of monitored volumes;

receiving infrared radiation from a third row of monitored volumes spaced at a second pitch in the first direction, the third row of monitored volumes consisting of a second number of monitored volumes, the second number being different than the first number;

receiving infrared radiation from a fourth row of monitored volumes spaced at the second pitch in the first direction, and offset from the third row of monitored volumes in the first direction, the fourth row of monitored volumes consisting of the second number of monitored volumes;

directing the infrared radiation from the first row of monitored volumes and the third row of monitored volumes onto a first set of detector elements of an infrared detector;

directing the infrared radiation from the second row of monitored volumes and the fourth row of monitored volume onto a second set of detector elements of the infrared detector;

analyzing a first signal generated by the first set of detector elements of the infrared detector and a second signal generated by the second set of detector elements of the infrared detector to detect movement of a warm object through at least a portion of the first row, the second row, the third row, and/or the fourth row of monitored volumes; and indicating that the movement of the warm object has been detected.

17. The method of claim 16, further comprising:

filtering the first signal with a first frequency compensation filter before the analyzing; and filtering the second signal with a second frequency compensation filter before the analyzing.

18. The method of claim 16, the analyzing comprising:

selecting a set of peaks in the first signal and in the second signal;

calculating an alternation score based on a number of alternating peaks in the set of peaks; and determining that the movement has been detected based, at least in part, on the alternation score.

19. The method of claim 16, the analyzing comprising:

determining a peak-to-peak period for the first signal;

calculating a slope-synchrony measurement based on a first average slope of the first signal over said period and a second average slope of the second signal over said period; and determining that the movement has been detected based, at least in part, on the slope-synchrony measurement.

20. The method of claim 16, the indicating that the movement has been detected comprising sending a message over a network, contents of the message dependent upon settings in the motion sensor, the contents including an occupancy status, an animal-immune intrusion indication, and/or a non-animal-immune motion detection indication.

* * * * *